(12) United States Patent
Koons et al.

(10) Patent No.: US 8,145,722 B2
(45) Date of Patent: Mar. 27, 2012

(54) MEDIA TRANSFER SYSTEM AND ASSOCIATED METHODS

(76) Inventors: Nathan Douglas Koons, Los Angeles, CA (US); Rafael Angel Andrade, Melbourne, FL (US); Frank Cooper, Melbourne, FL (US)

( * ) Notice: Subject to any disclaimer, the term of this patent is extended or adjusted under 35 U.S.C. 154(b) by 0 days.

(21) Appl. No.: 12/549,575

(22) Filed: Aug. 28, 2009

(65) Prior Publication Data

US 2010/0057872 A1    Mar. 4, 2010

Related U.S. Application Data

(60) Provisional application No. 61/092,534, filed on Aug. 28, 2008, provisional application No. 61/158,786, filed on Mar. 10, 2009.

(51) Int. Cl.
    *G06F 15/16*       (2006.01)
    *H04H 40/00*     (2008.01)

(52) U.S. Cl. ........ 709/206; 709/203; 709/227; 709/229; 455/3.06

(58) Field of Classification Search .................. 709/203, 709/206, 227, 229; 455/3.06
See application file for complete search history.

(56) References Cited

U.S. PATENT DOCUMENTS

| | | | |
|---|---|---|---|
| 6,545,698 B2 | 4/2003 | Hong | |
| 2002/0133557 A1* | 9/2002 | Winarski | 709/207 |
| 2003/0056093 A1* | 3/2003 | Huitema et al. | 713/156 |
| 2003/0105829 A1* | 6/2003 | Hayward | 709/214 |
| 2005/0185918 A1* | 8/2005 | Lowe | 386/46 |
| 2006/0242590 A1* | 10/2006 | Polivy et al. | 715/760 |
| 2007/0088818 A1* | 4/2007 | Roberts et al. | 709/224 |
| 2007/0226338 A1* | 9/2007 | Burch et al. | 709/225 |
| 2007/0226365 A1* | 9/2007 | Hildreth et al. | 709/231 |
| 2008/0034220 A1 | 2/2008 | Abu-Amara et al. | |
| 2008/0205358 A1* | 8/2008 | Jokela | 370/338 |

* cited by examiner

*Primary Examiner* — Philip Chea
*Assistant Examiner* — Peter Shaw
(74) *Attorney, Agent, or Firm* — Mark R. Malek, Esq.; G. Philip J. Zies, Esq.; Zies Widerman & Malek

(57) ABSTRACT

A media transfer system includes a media transfer messaging application stored on a central server to be downloaded by a plurality of client devices and stored thereon. The plurality of client devices are communication with a network. The plurality of client devices having the media transfer messaging application stored thereon are enabled to transmit media between one another via the network and are defined as a receiving client device when receiving media and a sending client device when sending media. The sending client device is authenticated prior to sending media to be defined as an authenticated sending client device, and media sent from the sending client device is received by the receiving client device as a message. The receiving client device is adapted to accept, reject or delay delivery of the message, and is adapted to send a message received from a sending client device to at least one receiving client device. The media transfer messaging application may include a network traffic load awareness system to determine optimal delivery times of the message.

39 Claims, 15 Drawing Sheets

MEDIA TRANSFER SYSTEM AND ASSOCIATED METHODS

RELATED APPLICATIONS

This application is related to and claims the benefit of U.S. Provisional Patent Application Ser. No. 61/092,534 titled AUDIO VIDEO RING TONES ASSOCIATED WITH A SOCIAL NETWORK AND ASSOCIATED METHODS filed on Aug. 28, 2008, and U.S. Provisional Patent Application Ser. No. 61/158,786 titled AUDIO VIDEO RING TONES ASSOCIATED WITH A SOCIAL NETWORK AND ASSOCIATED METHODS filed on Mar. 10, 2009, the entire contents of each of which are incorporated herein by reference.

FIELD OF THE INVENTION

The present invention relates to the field of media enabled devices and, more specifically, to transmission of messages containing media between media enabled devices.

BACKGROUND OF THE INVENTION

Users of media enabled mobile devices sometimes choose to assign various ring tones or thumbnail photographs with a particular contact that may be stored in a contacts file on the user's mobile device. For example, a user may wish to assign a picture to a particular contact, as well as a customized ring tone. Accordingly, the user may access the contact information stored on the mobile device, and assign a ring tone that is stored on the mobile device, as well as a picture that is stored on the mobile device to the particular contact.

Users of media enabled mobile devices also sometimes choose to send messages including media files to other media enabled devices. For example, a first user may take a photograph using a media enabled device and wish to share that photograph with a second user having a media enabled device. This can be accomplished by transmitting the photo to the second user's media enabled device using multimedia messaging service (MMS). MMS allows users to transmit photos and videos, for example, between mobile devices that are media enabled. MMS also allows users to transmit messages including media files from a media enabled device to a computer.

U.S. Published Patent Application No. 2008/0034220 by Abu-Amara et al. discloses a method for using entertainment files as ring tones. The method includes playing a part of an original entertainment file while an incoming call signal is acknowledged. The method also includes using a local encryption key to encrypt the original entertainment file and form a second entertainment file to be stored on the communication device. Such a method and system requires the communication device to include a memory unit, a processor, a media player, and a transceiver. This is not uncommon, and is desirable in order to play media files. This type of application, however, only allows a user to customize their own communications device with media files.

U.S. Pat. No. 6,545,698 to Hong discloses a mobile video telephone with an automatic answering function that allows a user to send a distinct outgoing message to a specified person. More specifically, the mobile video telephone determines whether there is an automatic answering mode upon receipt of an incoming call. If an automatic answering mode is set, the video telephone sends an answering screen, including a password input request message. Upon receiving a valid password, the mobile video telephone sends a video massage associated with the password.

There exists a need to provide a system that allows a user to send and receive media messages that is easy to manage, and that does not require excessive storage space for such messages. There also exists a need for a system that allows users to transfer media between various media enabled devices and portals, i.e., cellular telephones, wireless devices, public exchange telephones, computers, social networking websites, etc., regardless of the format of the media.

SUMMARY OF THE INVENTION

With the foregoing in mind, it is therefore an object of the present invention to provide a system and methods that allows users to transfer media between various media enabled devices and portals, i.e., cellular telephones, wireless devices, public exchange telephones, computers, social networking websites, etc., regardless of the format of the media. It is also an object of the present invention to provide a system and methods that allow users to send ringtones or video tones to a receiving client device. It is further an object of the present invention to provide a system and methods to allow users to accept media messages when convenient, i.e., allow the user to elect to accept, reject or delay delivery of the message containing media being transmitted.

It is still further an object of the present invention to provide a system and methods that allow for media to be transferred between media enabled devices and that includes a network traffic load awareness system to determine optimal delivery times of messages containing media. It is yet another object of the present invention to provide a system and methods that allow for media to be transferred between media enabled devices and that includes a network caching system to store popular media, i.e., media that is being repetitiously downloaded and transmitted, on a local network server to optimize delivery time.

These and other objects, features and advantages of the present invention are provided by a media transfer system comprising a media transfer messaging application stored on a central server to be downloaded by a plurality of client devices and stored thereon. The plurality of client devices is preferably positioned in communication with a network. Each of the plurality of client devices having the media transfer messaging application stored thereon may be enabled to transmit media between one another via the network.

Each of the plurality of client devices may be defined as a receiving client device when receiving media and a sending client device when sending media. The sending client device may be authenticated prior to sending media. Upon authentication, the sending client device may be defined as an authenticated sending client device. At least one of the plurality of client devices may be a handheld media enabled device such as, for example, a cellular telephone having media capabilities.

Media sent from the sending client device using the media transfer messaging application may be received by the receiving client device as a message. The receiving client device may accept, reject, delay or schedule delivery of the message. This advantageously allows a user of the receiving client device to ensure that the message containing the media file is only delivered at a convenient time. The receiving client device may send a message received from a sending client device to at least one receiving client device. Accordingly, the receiving client device may advantageously be used to forward messages containing media files to other media enabled devices. The media transfer messaging application may include a network traffic load awareness system to determine optimal delivery times of the message. This advantageously decreases burden on the network by avoiding transmission of messages containing media files during congested periods of time.

The message including the media files may includes a preamble and a main body. The preamble and the main body may be separated by a pause having a predetermined time length. The receiving client device may accept, reject, delay or schedule delivery of the message during the pause. This advantageously allows the user of the receiving client device to view the preamble and determine whether or not to elect to receive the message containing the media file. The media in the message may be any type of media in any kind of format. For example, the media may be any one or a combination of audio, video, pictures or text. The client devices may be any type of media enabled client devices. For example, the client devices may be a wireless device, such as a cellular phone, for example, adapted to be connected to a network, a public exchange phone or a social networking portal.

The media in the message may be used as a ringtone or a videotone to be received by the receiving client device so that the sending client device may determine the type of ringtone or videotone to be played on the receiving client device. This advantageously allows a sender to customize the notification to be received by the receiving client device when receiving a message from the sender. The media received by the receiving client device may be stored on an internal memory on the receiving client device. The media transfer messaging application may interface with a contacts file stored on each of the plurality of client devices to transfer the message to at least one selected contact. This advantageously allows a user to leverage the database of contacts that already exists to optimize usage of the present invention.

The receiving client device may be adapted to Block incoming messages based on a predetermined parameter. The predetermined parameter may advantageously be selected by the user of the receiving client device. For example, the user may desire to Block all messages. In such a case, the predetermined parameter that may be used to Block messages by the receiving client device may be all messages. Also for example, the predetermined parameter may relate to a predetermined sending client device, messages having a predetermined type of content, or even messages having greater than a predetermined size. This feature of the present invention advantageously allows for enjoyed use of the media transfer system without worry of receiving undesired messages.

The media transfer messaging application may determine if the receiving client device is available to receive the message prior to delivering the message to the receiving client device. The media in the message may be stored on an internal memory of the sending client device and/or on the network while the media transfer messaging application determines whether or not the receiving client device is available to receive the message. This advantageously ensures that a message containing media sent by a sending client device is received by the receiving client device.

The network may include a central server and a plurality of local servers in communication with the central server. The plurality of local servers may be deployed over a plurality of geographical locations of interest. The media transfer messaging application may include a network caching system to monitor geographical activity of a predetermined media item being transferred between the plurality of client devices. The network caching system may store the predetermined media item on one of the plurality of local servers for a predetermined amount of time based on the activity of the predetermined media item being transferred between the plurality of client devices in a predetermined geographical location. The network caching system is advantageous when a predetermined media item becomes very popular, for example, in a particular geographical location. In such a case, the network caching system, upon recognizing that the predetermined media item has reached a predetermined level of use in a particular geographical location, may store a copy of the predetermined media item on a local server. Accordingly, after the predetermined media item has been stored on the local server, the predetermined media item may be downloaded from the local server that is used to serve the geographical location in question, instead of the predetermined media item being downloaded and transmitted from the central server. This advantageously decreases network congestion.

The media being transferred may, for example, be a voicemail. The voicemail may be transferred from the sending client device to one or more receiving client devices. For example, in a first client device has received a voicemail, and desires to share that voicemail with additional client devices, the first client device may simply forward the voicemail to as many additional client devices desired. This advantageously allows voicemails to be shared by multiple client devices.

A method aspect of the present invention is for transferring media between a plurality of client devices in communication with one another via a network. The method may include authenticating the sending client device prior to sending media to define an authenticated sending client device. The method may also include receiving the media as a message on the receiving client device, and sending a received message from the receiving client device to a sending client device. The method may further include determining optimal delivery times of the message using a network traffic load awareness system.

DETAILED DESCRIPTION OF THE PREFERRED EMBODIMENT

Figure 1:
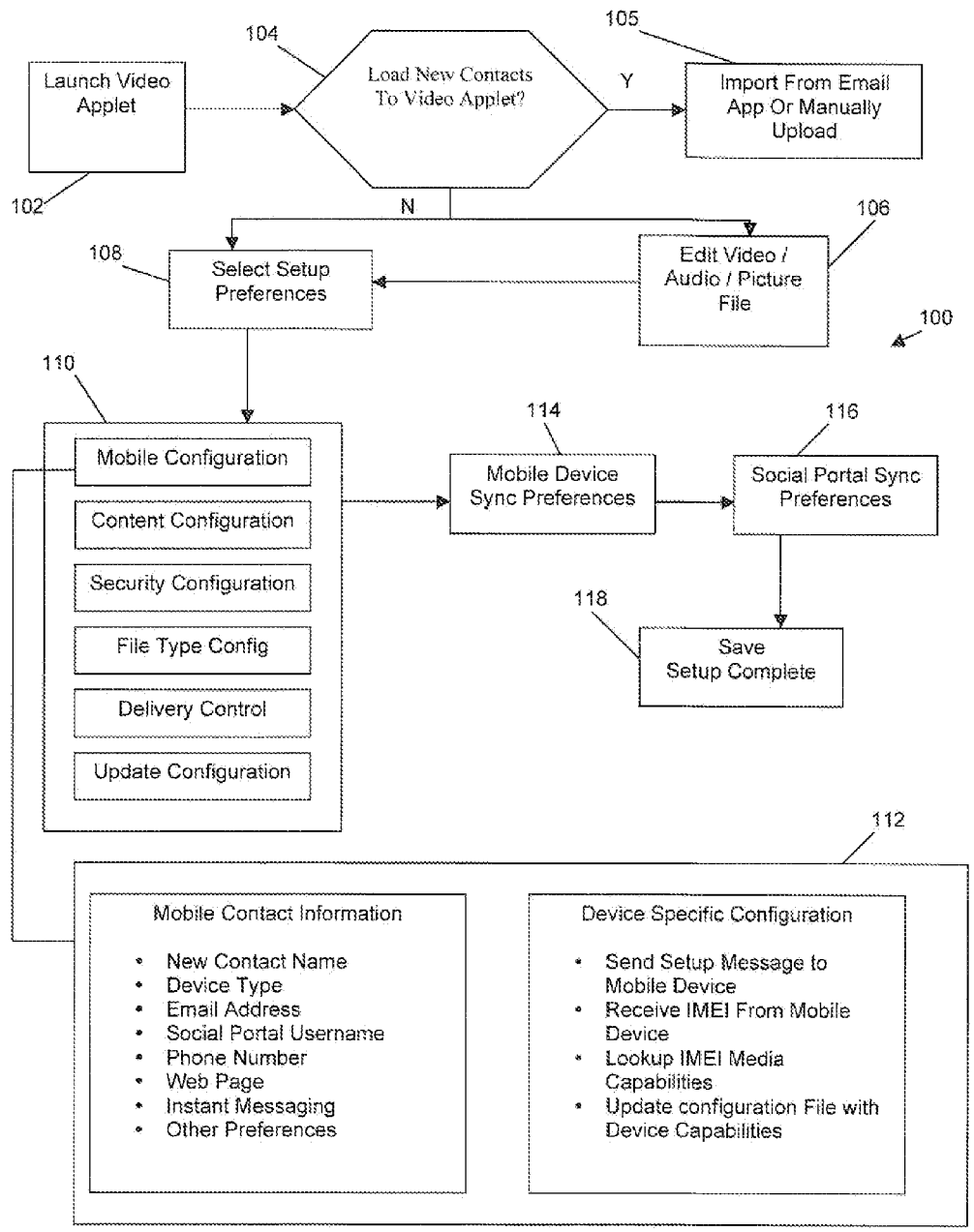
FIG. 1 is a flowchart illustrating setup of the application of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations, if used, refer to similar elements in alternate embodiments.

The system according to the present invention is a computerized system that requires the performance of one or more steps to be performed on or in association with a computerized device, such as, but not limited to, a server, a computer (i.e., desktop computer, laptop computer, netbook or a machine having a processor), a dumb terminal that provides an interface with a computer or server, a personal digital assistant, mobile communications device, such as an iPhone, Blackberry or other similar device which provides computer or quasi-computer functionality, a personal entertainment device such as a Personal Play Station, iPod Touch or other similar device which can be connected to an external computer, other personal entertainment devices or a wireless network, a mobile reader, such as a Kindle, which provides reader functionality that may be enabled through either internal components or connecting to an external computer, server or global communications network (such as the Internet) to take direction from or engage in processes which are then delivered to the mobile reader. It should be readily apparent to those of skill in the art that other types of devices, individually or in conjunction with an overarching architecture associated with an internal or external system, may be utilized to provide the "computerized" environment necessary for the at least one process step to be carried out in a machine/system/digital environment. It should be noted that the method aspects of the present invention are preferably computer implemented methods and, more particularly, at least one step is preferably carried out using a computerized device.

The audio/video ring tone application of the present invention advantageously allows a user to manage audio, picture and video files, i.e., media files, and send them as ring tones or "video rings" to multimedia wireless devices. The application allows a sender to distribute ring tones and video rings via social networking services (i.e. Facebook, Myspace®, Bebo®, etc), content portals (i.e. Youtube®, etc.), instant messenger services (i.e. Yahoo®, MSN, AOL, etc.), email clients (i.e. Outlook®, Gmail®, Yahoo® mail, Hotmail, etc.), voice over packet services (i.e. Skype®, etc) or simply from the sender's computer. The sender may also be able to select a ring tone or video ring from a web page, file location, or storage media.

The application of the present invention allows the sender to create and manage a list of recipients, or to acquire a list from any other application that already contains a contact list, i.e., import contacts from a previously set up directory. The sender may select an audio, picture or video file as well as the recipients. It is known in the prior art to engage in a default paging procedure that takes place prior to a wireless device ringing. The present invention, however, advantageously allows the wireless network to request permission to transfer a file or a plurality of files. These files are preferably used instead of a default ring. Further, the files are preferably sent by a pre-approved sender. The sender is preferably pre-approved as a separate function. In other words, users may approve one another to become approved senders to one another. This advantageously prevents any misuses of the application by unauthorized users.

Upon authentication of the sender, a file may be downloaded to a media enabled device. The present invention contemplates that a media enabled device includes both wired and wireless devices of any kind that are capable of playing any kind of media, including computers and other non-mobile wireless devices. This may include a preamble greeting that may be initially played. Thereafter, the file that was transmitted may be played. When the preamble is played, the receiver of the message may have an option to listen or view the downloaded file, delay playback of the downloaded file or cancel receipt of the file/message.

If an audio file is received, the media enabled device may play the audio file while displaying the caller identification information already stored in the device. Audio files may be sent along with picture files that may be displayed as the audio plays on the media enabled device. If playback of the audio file is delayed, a thumbnail image with the sender's information may be displayed. This can advantageously be accomplished by displaying a picture file that is stored temporarily on a memory of the receiving device, or by sending a picture file to the media enabled phone.

The picture may, for example, be a thumbnail that can be generated using the sender's audio video ring tone application, the wireless carrier, or the portal in use. When a video file is received, the caller identification information may be displayed briefly before or after the video file is played. If playback is delayed for a video ring, a thumbnail image may be captured from the video stream, for example, and displayed along with the sender's caller identification information when stored temporarily.

Similar to the audio playback, the thumbnail may be generated by the sender applet, the wireless carrier or the portal in use. After the file has completed playing, the media enabled device may be used to call the sender's preferred number, transmit a text message to the sender, save the transmitted file to a local file system to be later used for the receiver's use, or go into an idle mode. If the user selects to save the transmitted file to a local file system for later use, the present invention contemplates that the later use of the saved transmitted file may be for a predetermined fee. If the device goes into idle mode as a result of no user input, the transmitted file may alternatively be deleted from memory. The receiving party may have a user menu to select "pre-set" actions when receiving video rings, i.e., video files or ring tones, i.e., audio files.

In the event a called party is not available, a default response audio/video clip may be transmitted to the sender. This is configurable via the media enabled device or through the applet running in the media enabled device, portal or PC. When the receiving party comes back online, the audio/video content does not have to be re-transmitted through wireless carrier. Instead, the content may remain in the sender's portal, or in a server on the wireless network as an add-on service. Upon the wireless user returning to idle mode, the aforementioned process of receiving an incoming audio/video ring may be initiated.

Because the applet allows the user to create and link to their own audio/video content, the present invention advantageously allows for customization of audio and video greetings for individual callers and/or for caller groups. This can be done immediately after the playback or can be preconfigured in the applet. The user may be able to create and edit their video library into duration specific clips with an edit feature that may be present in the applet. The applet may also advantageously allow users to automatically Block unsuitable content from being delivered to the wireless device.

The present invention advantageously creates additional revenue for various portals that allow users to post content, and other users to view and or listen to content free of charge. Generally, portals such as this rely on advertising revenue. One problem that has arisen for such portals is their unexpected success and need for additional server space to accommodate their users. The present invention also advantageously creates a potentially popular application for wireless carriers to attract data subscribers and increase the average revenue per user with respect to data customers.

Those skilled in the art will appreciate that a fee can be charged at any stage of the media transfer process and by any user. For example, a sender may be required to pay a fee to send a media file as a ring tone to another user's media enabled device. Similarly, a fee may be charged to the receiving party for receiving the media message on their media enabled device. In other words, fees can be charged in any number of ways to increase revenue associated with media file transfer to, from and between media enabled devices. Those skilled in the art will also appreciate that a fee may be charged for storing a media file if storage is required. This may be especially advantageous in the case of digitally recorded music with respect to smaller artists that wish to proliferate their content via the internet instead of a record label.

The present invention contemplates charging different fees for different files, or dependent upon file size. In other words, a video file may have a different fee structure than an audio file, which each may have different fee structures for picture files. Further, it is contemplated that larger files, or files exceeding a predetermined threshold limit, may also be charged a predetermined fee. The present invention also contemplates a fee per unit of information, if so desired, or a flat fee to send unlimited numbers of files, regardless of size. The present invention further contemplates fee structures that allow for introductory rates, and fee structures that may be associated with certain group networks. For example, an independent fee structure may be set up when users of similar wireless networks send media files to one another. Another fee structure may be set up for any and all employees of a particular company, or students of a particular school. In summary, those skilled in the art will appreciate that an infinite number of fee structures are contemplated by the present invention.

The application of the present invention may advantageously be run as an applet on an existing social networking site. Accordingly, the application of the present invention may take advantage of features of the social networking site while providing flexibility to create, edit, send, schedule, Block and/or receive audio/video rings. The applet may also allow a user to customize how, when and from whom to receive specific type of content. For example, most accounts on social networking sites allow users to have a plurality of "friends", i.e., authorized users. The user may decide send a media file to a predetermined number of friends on their social networking site. This can easily be accomplished by allowing the user to associate identifications, i.e., phone numbers, of users having media enabled devices, and selecting those people from the user's network that the user desires to transmit the media file to. The user may only select one person, a plurality of people, or distribution lists to send the message to. This may advantageously allow the user to send media files that are stored on the user's computer or from the user's media enable device.

The application of the present invention may advantageously have the ability to run as an applet on a media enabled wireless devices and take advantage of wireless features, i.e., cellular, WiFi, WiMax and others, while simultaneously allowing flexibility to create, edit, send, schedule Block and/or receive media files, i.e., audio and/or video rings. The applet may also allow a user to customize how, when and from whom to receive a specific type of content. The present invention also advantageously has the ability to run as an applet on PCs while taking advantage of contacts lists, e.g., such as those found on Outlook® and Eudora®, to create, edit, send, block and/or receive media files. The applet may further allow a user to customize how, when and from whom to receive a specific type of content.

The application of the present invention also advantageously provides a user the ability to push and/or pull customized media files safely and virus free to and from wireless mobile devices. Further, the applet may allow for default or device specific compression of media content for minimum bandwidth utilization during the transfer process. The application of the present invention may also allow the user to select a ring tone or video ring that recipients will hear when the caller calls. In other words, the application allows the caller to set the ring tone to be heard, whereas traditionally, it is the receiver that sets a specific ring tone.

The application of the present invention is preferably a software solution that relies on security mechanisms already present in wireless networks and secure web portals. More specifically, the invention may be an applet that allows users to take advantage of existing features of wireless networks and networking portals to interact with users of media enabled devices in a new way. The solution is independent of radio access technology, operating system and computing platforms.

Referring now to FIG. 1, a flowchart 100 describing setup of the application of the present invention is now described in greater detail. At Block 102, a video applet is launched. At Block 104, it is decided whether or not to load new contacts to the video applet. If it is decided at Block 104 not to load new contacts to the video applet, then the medial file is edited at Block 106. If, however, it is decided at Block 104 to load new contacts to the video applet, then the new contacts are imported from an email application, for example, or loaded manually at Block 108. Those skilled in the art will appreciate, however, that the contacts may be imported or loaded in any manner desired.

At Block 108, setup preferences are determined. These preferences can include, for example, mobile configuration, content configuration, security configuration, file type configuration, delivery configuration and update configuration, as illustrated in Block 110. If the setup preference that is desired is mobile configuration, then at Block 112, mobile contact information and/or device specific configuration information may be entered. For example, some of the mobile contact information that may be entered may include a contact name, a device type, and email address, a social portal user name, a phone number, a web page, an instant message identifier, or any other number of preferences as understood by those skilled in the art. Some of the device specific configuration information may include setup messages that may be sent to media enabled mobile devices, receiving the international mobile equipment identification (IMEI), looking up the IMEI media capabilities and updating file configurations with the media enabled device capabilities.

Thereafter, at Block 114, the preferences that were selected at Block 110 and Block 112 may be synced with the media enabled mobile device. At Block 116, social portal preferences may be synced with the media enabled mobile device. The preferences and setup may be saved at Block 118, where the setup is subsequently completed.

Figure 2:
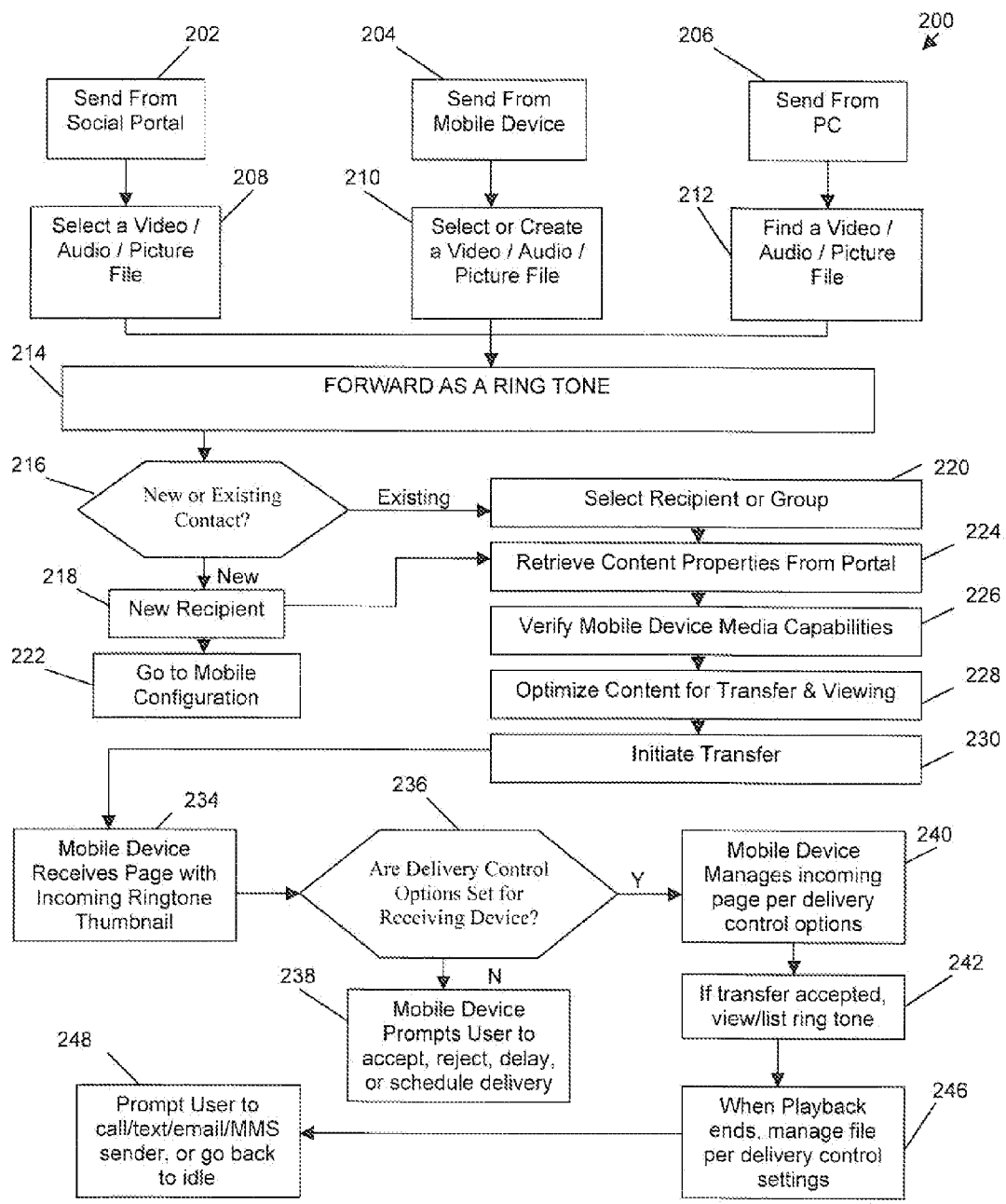
FIG. 2 is a flowchart illustrating a method for sending a media file according to the present invention.

Referring now additionally to FIG. 2, another flowchart 200 illustrating a method of sending a media file according to the present invention is now described in greater detail. At Blocks 202, 204 and 206, it is decided where to send the media file from. In other words, the flowchart 200 illustrates that the media file may be sent from any of the above referenced devices. Accordingly, if the method is started from Block 202, the media file is being sent from a social portal. If the method is started from Block 204, the media file is being sent from a media enabled mobile device, and if the method is started from Block 206, the media file is being sent from a personal computer.

When sending the media file from a social portal, as in Block 202, the user may select a media file, such as a video file, an audio file and/or a picture file to be transmitted at Block 208. When sending the media file from a media enabled mobile device, as in Block 204, the user may select, or create, a media file, such as a video file, an audio file and/or a picture file to be transmitted at Block 210. When sending the media file from a personal computer, as in Block 206, the user may first find a media file, such as a video file, an audio file and/or a picture file that is stored on the computer's memory and that is desired by the user to be transmitted at Block 212.

From this point forward, the method is similar whether the media file is transmitted form a social portal, a media enabled mobile device or a personal computer. More specifically, and with reference to Block 214, after the media file has been selected in Blocks 208, 210 and 212, the media file is forwarded as a ring tone to a selected recipient at Block 214.

At Block 216, it is initially determined whether or not the recipient of the proposed media file to be transmitted is a new recipient (Block 218) or an existing recipient that can be selected by the sender from, for example, a database (Block 220). Those skilled in the art will appreciate that the sender may select an individual to transmit a message to, a plurality of recipients to send the message to, or a preselected group to send the message to. If the selected recipient is a new recipient, then the configurations described in the flowchart 100 of FIG. 1 are initially set up at Block 222. At Block 224, content properties from the portal may be retrieved.

At Block 226, the mobile device media capabilities are verified. For example, if a selected recipient does not have a media enabled mobile device, then a media message may not be able to be transmitted to that proposed recipient. This is verified at Block 226. At Block 228, the content of the media file is optimized for transfer. This may include, for example, compressing the file for faster transmission. At Block 230, the transfer of the media file is initiated.

Referring now more specifically to Block 232, receipt of the media file is now described in greater detail. At Block 234, a media enabled mobile device receives a page with an incoming ring tone thumbnail. As described above, the incoming ring tone thumbnail may, for example, be provided by a picture that is stored on the recipients media enabled device, a screen shot of a video file that is being transmitted, or even a picture file that is being transmitted by the sender. Those skilled in the art will appreciate that the source of the thumbnail may be from any number of places.

At Block 236, it is determined whether or not delivery control options are set for the receiving device. If it is determined at Block 236 that the delivery control options are not set for the receiving device, then the user may be prompted to accept, reject, delay/postpone or schedule delivery of the media file being transmitted at Block 238. If, however, it is determined at Block 236 that the delivery control options are set for the receiving device, then the media enabled device may manage the incoming page per the delivery control options at Block 240. At Block 242, the media file, i.e., the ring tone, is transmitted and played if accepted. At Block 246 the transmitted file is managed pursuant to the delivery control settings when the playback is completed. If, however, the delivery control settings are not set, then the user of the receiving device is prompted to enter an instruction. This instruction may, for example, include an option to save the media file, purge or delete the media file, or forward the media file. At Block 248, the user is prompted to call, send a text message to, send an email to or send a multimedia message to the sender. The user may also select to allow the media enabled device to go into an idle state at Block 248.

Figure 3:
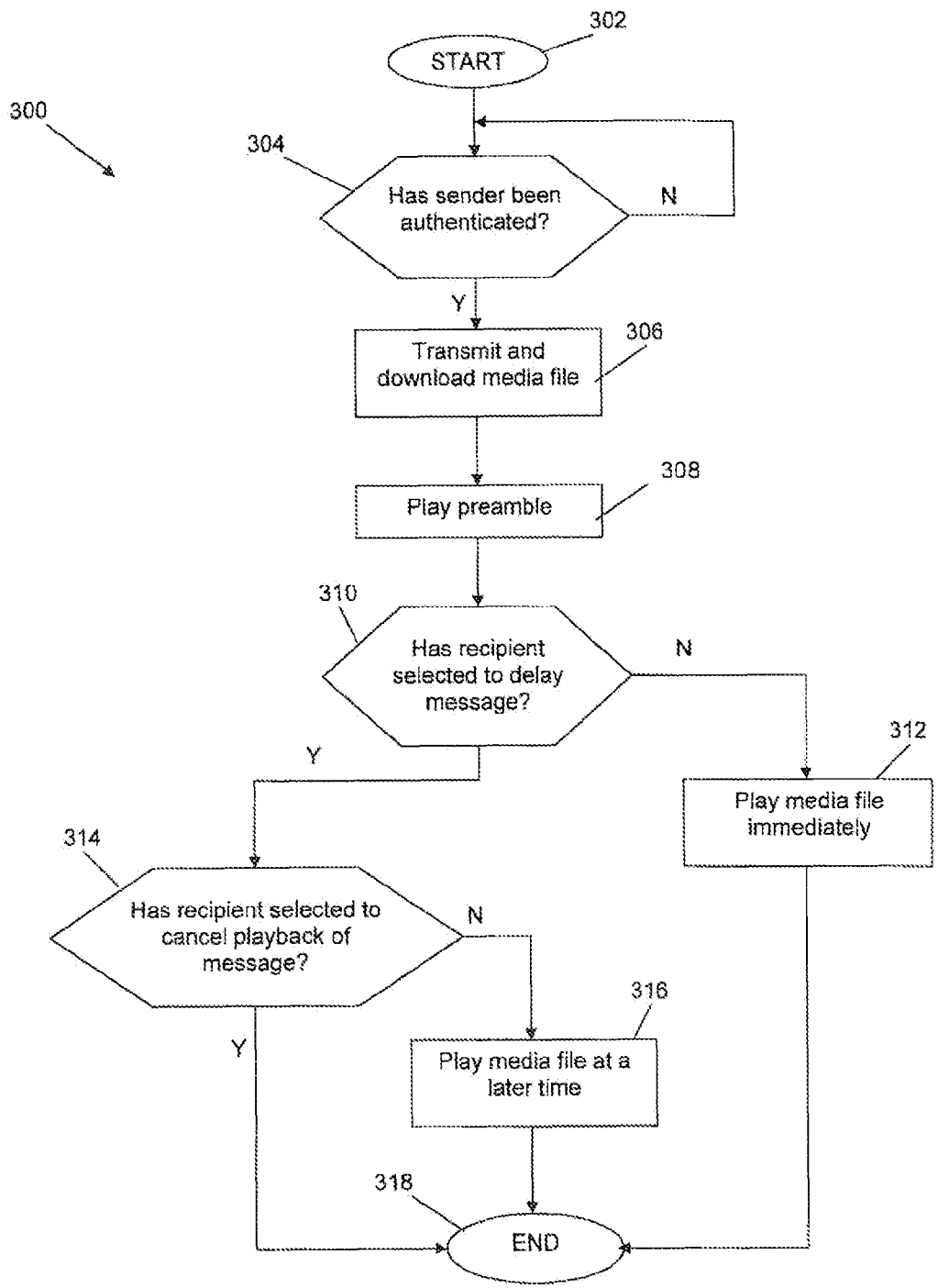
FIG. 3 is a flowchart illustrating a method aspect of the present invention.

Referring now additionally to the flowchart 300 of FIG. 3, additional method aspects of the present invention are now described in greater detail. From the start (Block 302), it is determined at Block 304 whether or not a sender has been authenticated. If it has been determined at Block 304 that the sender has not been authenticated, then authentication is awaited. If, however, it is decided at Block 304 that the sender has been authenticated then the media file is transmitted and downloaded at Block 306. At Block 308, a preamble may be played.

At Block 310, it is determined whether or not the recipient has selected to delay the message. If it is determined at Block 310 that the recipient has selected not to delay the message, then the media file is played immediately at Block 312. If, however, it is determined at Block 310 that the recipient desires to delay receipt of the message, then it is determined at Block 314 whether or not the recipient has selected to cancel playback of the message. If the recipient has desired to cancel playback of the message, then the method is ended at Block 318. If, however, the recipient has decided not to cancel playback of the message, then the media file is played at a later time at Block 316. Thereafter, the method is ended at Block 318.

Figure 4:
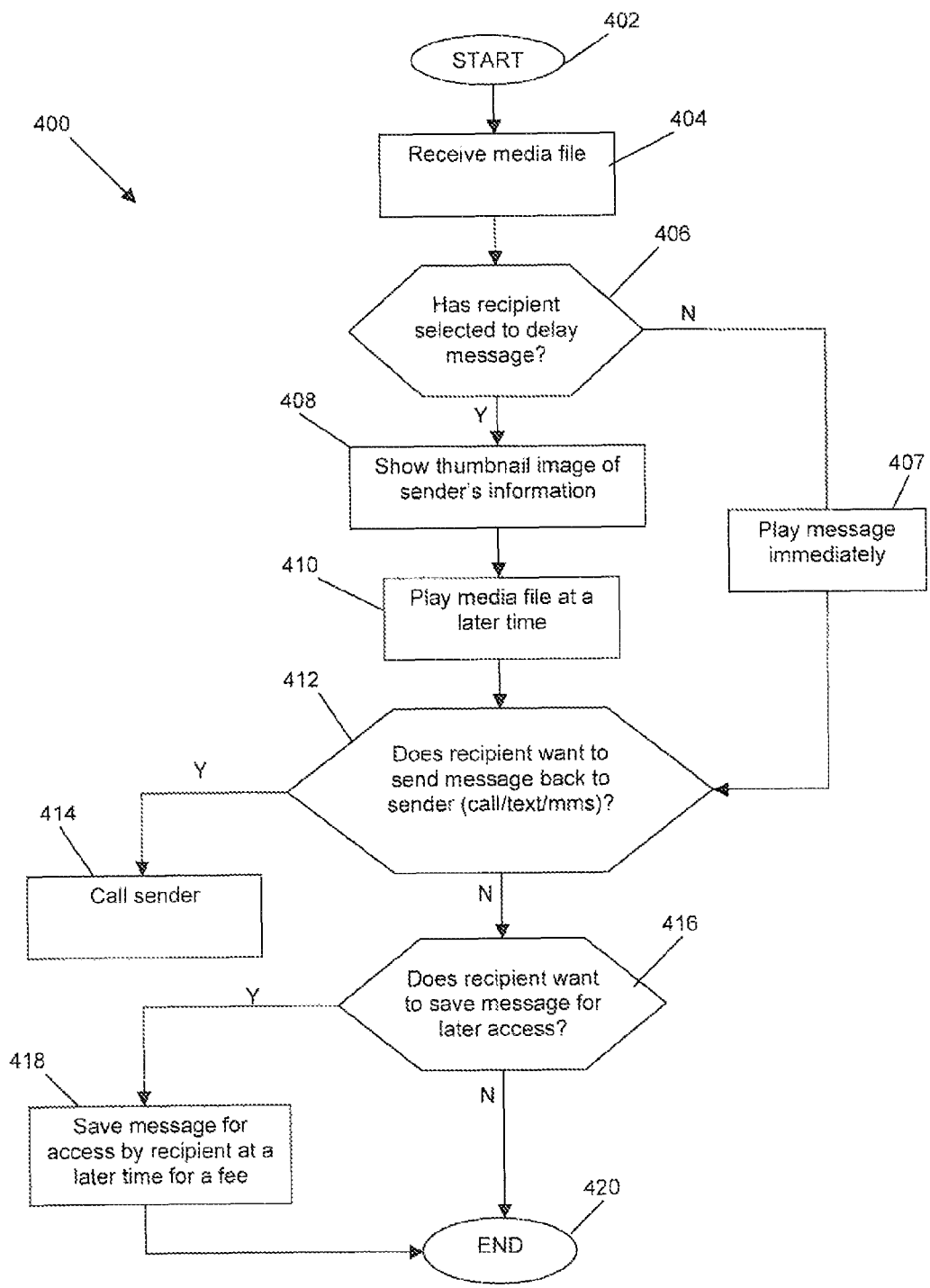
FIG. 4 is a flowchart illustrating another method aspect of the present invention.

Referring now additionally to the flowchart 400 of FIG. 4, yet another method aspect of the present invention is described in greater detail. From the start (Block 402), a media file is received at Block 404. At Block 406, it is determined whether or not the recipient wishes to delay receipt of the media file. If the recipient does not wish to delay receipt of the media file at Block 406, then the message is played immediately at Block 407. If, however, the recipient desires to delay receipt of the media file at Block 406, then a thumbnail image of the sender's information is displayed at Block 408.

The thumbnail image may be any image as described above. For example, the thumbnail image may be a picture stored on the recipient's media enabling device, may be a screen shot from a video media file, or any other type of thumbnail image as understood by those skilled in the art. At Block 410, the media file is played at a later time as desired by the user. At Block 412, it is determined whether or not the recipient wishes to send a message to the sender. For example, the recipient may wish to call, text, send a multi-media message to, or any other type of message to the sender. If it is determined at Block 412 that the recipient wishes to communicate with the sender, then the recipient may call, text, or send a multi-media message to the sender at Block 414. If, however, the recipient does not want to send a message back to the sender at Block 412, then it is determined at Block 416 whether or not the recipient wishes to save the message for later access. If the recipient wishes to save the message for later access, then the message is saved for access by the recipient at a later time for a fee at Block 418. If, however, it is determined at Block 416 that the recipient does not want to save the message, then the method is stopped at Block 420.

Figure 5:
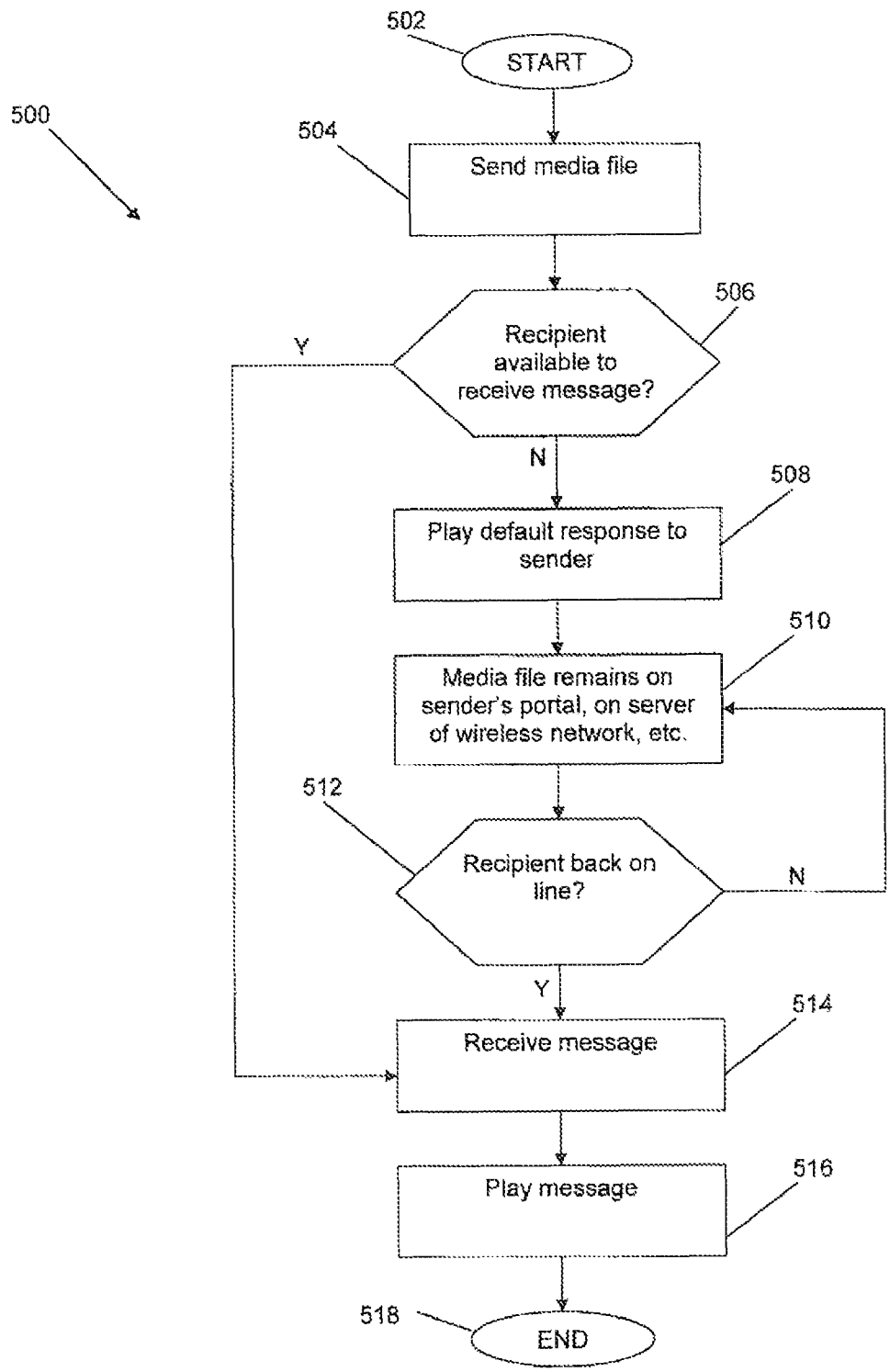
FIG. 5 is a flowchart illustrating yet another method aspect of the present invention.

Referring now additionally to the flowchart 500 of FIG. 5, still another method aspect of the present invention is now described in greater detail. From the start (Block 502), a media file is sent at Block 504. At Block 506, it is determined whether or not the recipient is available to receive the media message. If it is determined at Block 506 that the recipient is not available to receive the message, then a default response is sent to the sender at Block 508.

At Block 510, the media file remains on the sender's portal, or the server of the wireless network or on some other storage medium as understood by those skilled in the art. At Block 512, it is determined whether or not the recipient is back on line. If it is determined that the recipient is not on line, then the media file continues to be stored at Block 510. If it is determined at Block 506 that the recipient is available to receive the message, or at Block 512 that the recipient is back on line, then the message is received at Block 514. The message may be played at Block 516 and the method is stopped at Block 518.

With respect to delayed delivery, the present invention takes advantage of several features to improve performance of the download and quality of the downloaded media. More specifically, the one of the features used to enhance performance and quality may advantageously include low level open source initiative (OSI) stack awareness. For example, the applet of the present invention may include programming to understand the nature and content, i.e., media type, size, desired quality of service (QoS) parameters, etc. The features may also advantageously include link and transport layer quality awareness. More specifically, the applet may be programmed to poll the link through which content is to be downloaded and to transport layers to determine quality, latency and data rate metrics.

The performance enhancing features may further advantageously include network traffic load awareness. For example, the applet may tag traffic for the network to facilitate prioritization or re-prioritization of content for optimal delivery times within certain windows dictated by delivery control during times of high traffic volumes. This allows the applet of the present invention to advantageously take advantage of low traffic times to optimize delivery of the content. The performance enhancing features may still further include device idle and/or busy time awareness. For example, the applet of the present invention may be programmed to be aware of times when the device to receive the content is idle and/or busy, and may generate a trend of usages for specific subscribers. This awareness and trending may be used as an input to determine optimal delivery times. The main advantage of this performance enhancing feature is that both wireless and wireline service providers may normalize the applet specific traffic given that user specific delivery settings may indicate delayed delivery.

Another aspect of the present invention is directed to network caching via an applet server. As discussed above, one issue that has arisen with the popularity of video sharing is network congestion and delayed delivery of content. This network cashing aspect of the present invention takes advantage of potential delayed delivery preferences as selected by the user. Using these delayed delivery preferences, the wireless or wireline service provider has an option of deploying local servers across geographical locations of interest. The local applet servers may play various roles as will be discussed in greater detail below.

The local applet servers may provide a point of presence to monitor and trend content that is transferred in high quantities. More particularly, the applet server may monitor and evaluate the amount of activity that is related to a particular article of content. For example, as is often the case, a particular video or music clip, or some other type of content, as understood by those skilled in the art, may become extremely popular and widely transmitted between users. These users are often located in proximate geographical locations. Accordingly, the local applet server of the present invention advantageously monitors and identifies such content.

This local applet server may be helpful when media files are being shared by many users in close vicinity of one another, i.e., the same town, the same city, etc. In a normal operating environment, a user would normally retrieve content from the source location every time there was a request. Accordingly, such retrieval may congest the system. For example, if the source of the content is in a major metropolitan area, such as Los Angeles, Calif., and several users are attempting to retrieve the content in a suburban area, such as, for example, Melbourne, Fla., then the users attempting to retrieve the content from California could possibly congest several systems by doing so. Further, retrieving such content may be delayed by the need to retrieve the information from a major metropolitan location that is located a great distance away. In other words, the content needs to travel via several networks in order to be retrieved.

The new enhancement of the present invention allows the local applet server to retain content closer in vicinity of the users' population interested in that content. Based on predetermined thresholds, the applet server may store the content once it is determined that multiple users in a same geographical location require the content. This advantageously may enhance download speed of content while simultaneously decreasing congestion of a network.

In simple terms, a typical wireless network includes a hierarchy that begins at a national network, moves down to a regional network (multiple states), into a market network (portions of a particular state) and finally into location areas, routing areas, and paging areas. The local applet servers of the present invention could be deployed at any of the aforementioned locations to facilitate prompt delivery of content. This may be especially useful when specific content becomes popular and begins to be shared by many users across the country and world. The content may be stored on the local applet server for a predetermined amount of time, or until it is determined that the content is no longer popular. Thereafter, for the sake of conserving space, the present invention contemplates the ability to remove the content from the local server upon reaching a predetermined condition. Those skilled in the art will appreciate that the predetermined condition can be any number of factors such as, for example, a predetermined amount of time, or a decreased number of download requests, or any other number of factors.

Existing protocols, such as, bit torrent, may be used by the applet server to communicate via peer-to-peer networking. Accordingly, when new content is introduced, peers may be able to download the new content from one another upon introduction thereof. When the new content is introduced, the applet of the present invention may start monitoring demand of that content to determine when and where the content should be stored on a local network for a faster access and low latency and high transfer rate. Again, an advantage of this feature of the invention is that wireless and wireline service providers may advantageously deliver higher reliability, robust scalability and prompt availability of content to subscribers independent of where the content originally resides and where a download is being requested from.

Figure 6:
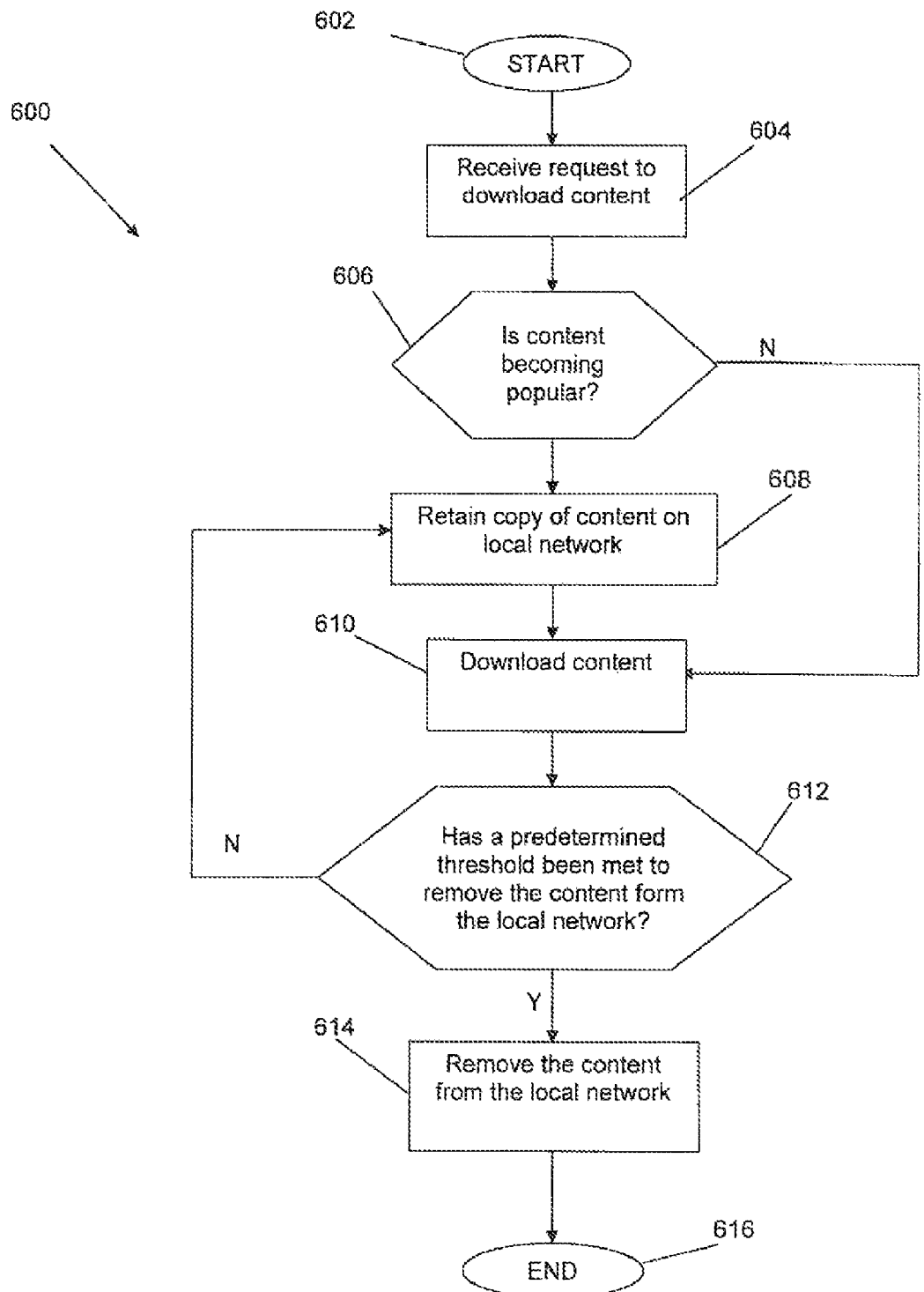
FIGS. 6-15 are additional flowcharts illustrating method aspects of the present invention.

Referring now additionally to the flowchart 600 of FIG. 6, a method aspect of the network caching aspect of the applet of the present invention is now described in greater detail. From the start (Block 602), a request is received to download content at Block 604. At Block 606, it is determined whether or not the content is becoming popular. As noted above, determination of whether or not the content is becoming popular depends on several factors, and the geographical location of the download request is also taken into account.

If it is determined at Block 606 that the content requested for download is becoming popular, then a local network may retain a copy of the content thereon at Block 608. If, however, it is determined at Block 606 that the content has not yet become popular, then the user downloads the content at Block 610. Of course, if a copy of the content is retained on the local network at Block 608, the content may be downloaded at Block 610.

At Block 612, it is determined whether or not a predetermined threshold has been met for moving content from the local network. If it is determined that the predetermined threshold has not been met at Block 612, then a copy of the content is retained on the local network at Block 608. If, however, it is determined that the predetermined threshold has been met at Block 612, then the content is removed at Block 614. The method is ended at Block 616.

Another aspect of the present invention is directed to a social voicemail. The social voicemail aspect of the applet of the present invention advantageously allows a user to improve the experience and flexibility of voicemail applications. More specifically, the social voicemail aspect of the applet of the present invention may allow a user to record, store and transfer voicemails to other users while taking advantage of already existing social networking applications and existing voicemail applications.

Some of the main features of the social voicemail aspect of the applet of the present invention are now described in greater detail. More specifically, voice messages may contain recorded and/or prerecorded audio and video content. Further, the social voicemail aspect of the applet of the present invention may include a gateway that interfaces the voice network entity (i.e., PSTN, SIP, and Jabber, etc.) and the message controller. Further, the social voicemail aspect of the applet may connect devices as peers, similar to a peer-to-peer network. The social voicemail aspect of the applet may be installed onto a device, such as a mobile phone, to record and transfer voice messages. The social voicemail aspect of the applet may store incoming multi-media messages in personalized groups associated with the user's social networking account, i.e., Facebook, MySpace®, Bebo®, Twitter, Linkedin, etc.

The social voicemail aspect of the applet according to the present invention may enable users to forward, reply, copy and blind copy received messages to other users' webpage and/or social networking applications. The social voicemail aspect of the applet of the present invention also contemplates the ability of the user to forward, reply, copy and blind copy received messages to other users' enabled mobile devices. It is contemplated that the user will be able to forward, reply, copy and blind copy other users with the voice message whether or not the social voicemail applet is installed on that device of the intended receiver. Of course, those skilled in the art will appreciate that it is preferably for the applet to be installed on the receiving device, but the present invention contemplates delivery of the voice message to devices not having the applet installed thereon.

The social voicemail aspect of the applet also advantageously allows a user to send messages to one or more other users as a broadcast. The user may also advantageously include an introductory message, or may append a message to a transmitted message. Similarly, the user may also advantageously select a portion of a message to be transmitted to other users.

The social voicemail aspect of the applet may also store voice messages for future delivery to other users. An e-mail notification may preferably be sent by the applet to a user indicating that a message has arrived on his or her webpage, or social network. Similarly, an e-mail may be generated to remind a user that a message has arrived on their webpage or social networking portal.

As indicated above, the applet may also provide the ability for the user to have various message greetings for various callers. The social voicemail aspect of the applet of the present invention may also annotate and collect metadata about voicemail, i.e., tagging and rating. The social voicemail aspect of the applet of the present invention also advantageously allows a user to archive voicemail and securely store groups of messages for future selection and/or delivery. The present invention also advantageously allows a user to specify a destination and a playback time of the content. This can be used as an advertisement or similar marketing message when sent to an enabled playback device.

Figure 7:
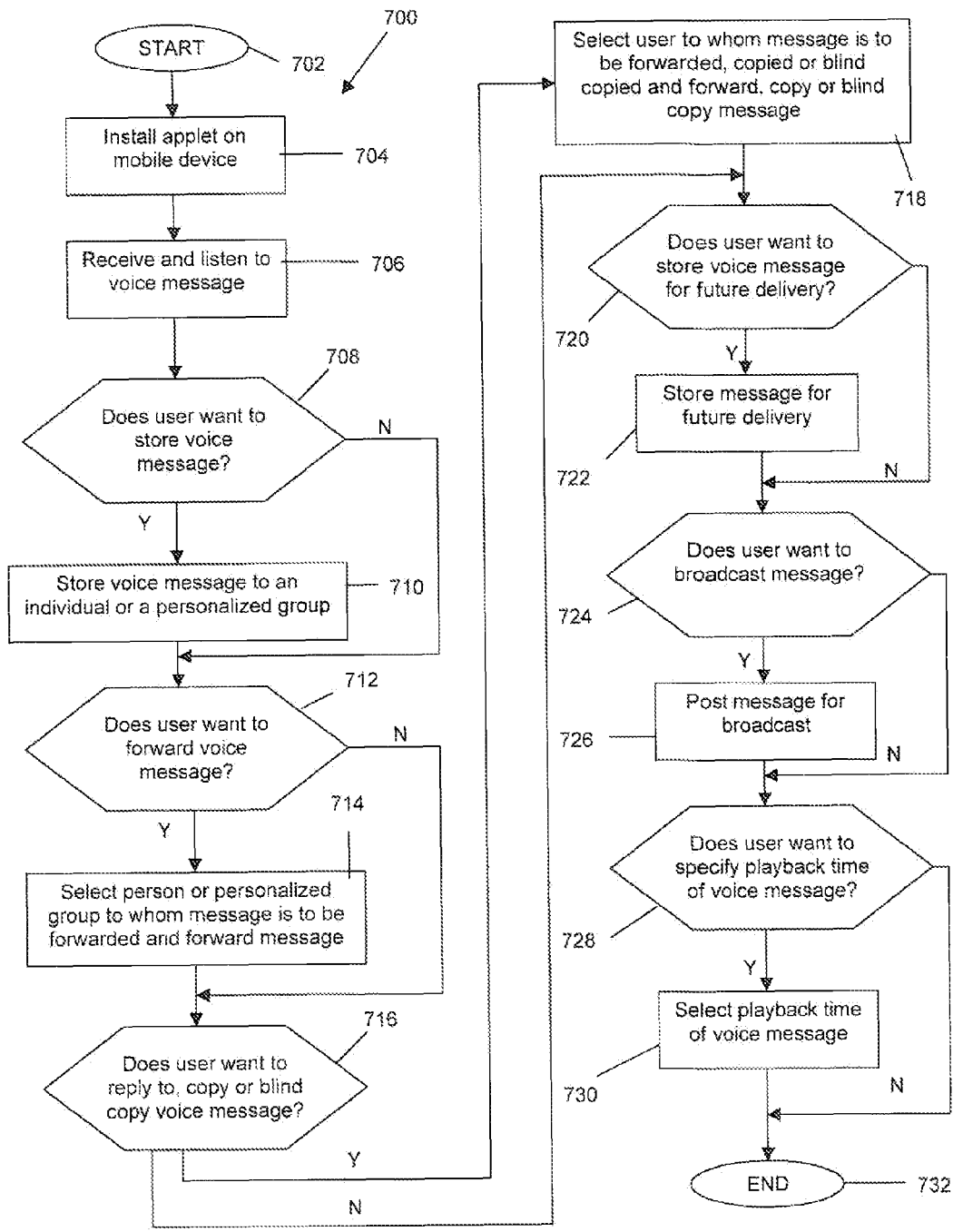

Referring now additionally to the flowchart 700 of FIG. 7, a method aspect of the social voicemail applet according to the present invention is now described in greater detail. From the start (Block 702), the social voicemail aspect of the applet according to the present invention is installed on a mobile device at Block 704. At Block 706, the user receives and listens to a voice message. At Block 708, it is determined whether or not the user would like to store the voice message to a personalized group. If it is determined at Block 708 that the user would like to store the message to a personalized group, then the message is stored to a personalized group at Block 710. Thereafter, or if it is determined at Block 708 that the user does not desire to store the message to a personalized group, then at Block 712 it is determined whether or not the user wants to forward the voice message. If it is determined at Block 712 that the user wants to forward the voice message, then at Block 714 the person or group to whom the user desires to forward the message is selected and the message is forwarded.

Thereafter, or if it is determined at Block 712 that the user does not want to forward the message, at Block 716 it is determined whether the user desires to reply, copy or blind copy the message. If it is determined at Block 716 that the user wants to reply, copy or blind copy the message, then the message is replied to, copied and/or blind copied to an individual or a group at Block 718. Thereafter, or if it is determined at Block 716 that the user does not desire to reply, copy or blind copy the message, then it is determined at Block 720 whether or not the user desires to store the message for future delivery. If, at Block 720, it is determined that the user desires to store the message for future delivery, then the message is stored for future delivery at Block 722.

Thereafter, or if it is determined at Block 720 that the user does not desire to store the message for future delivery, it is determined at Block 724, whether or not the user desires to broadcast the message. If it is determined at Block 724 that the user desires to broadcast the message, then the message is broadcast at Block 726. Thereafter, or if it is determined at Block 724 that the user does not desire to broadcast the message, then it is determined at Block 728 whether or not the user desires to specify a playback time. If it is determined at Block 728 that the user desires to specify a playback time, then the playback time is selected at Block 730. Thereafter, or if it is determined at Block 728 that the user does not desire to specify a playback time of the message, the method is ended at Block 732.

Figure 8:
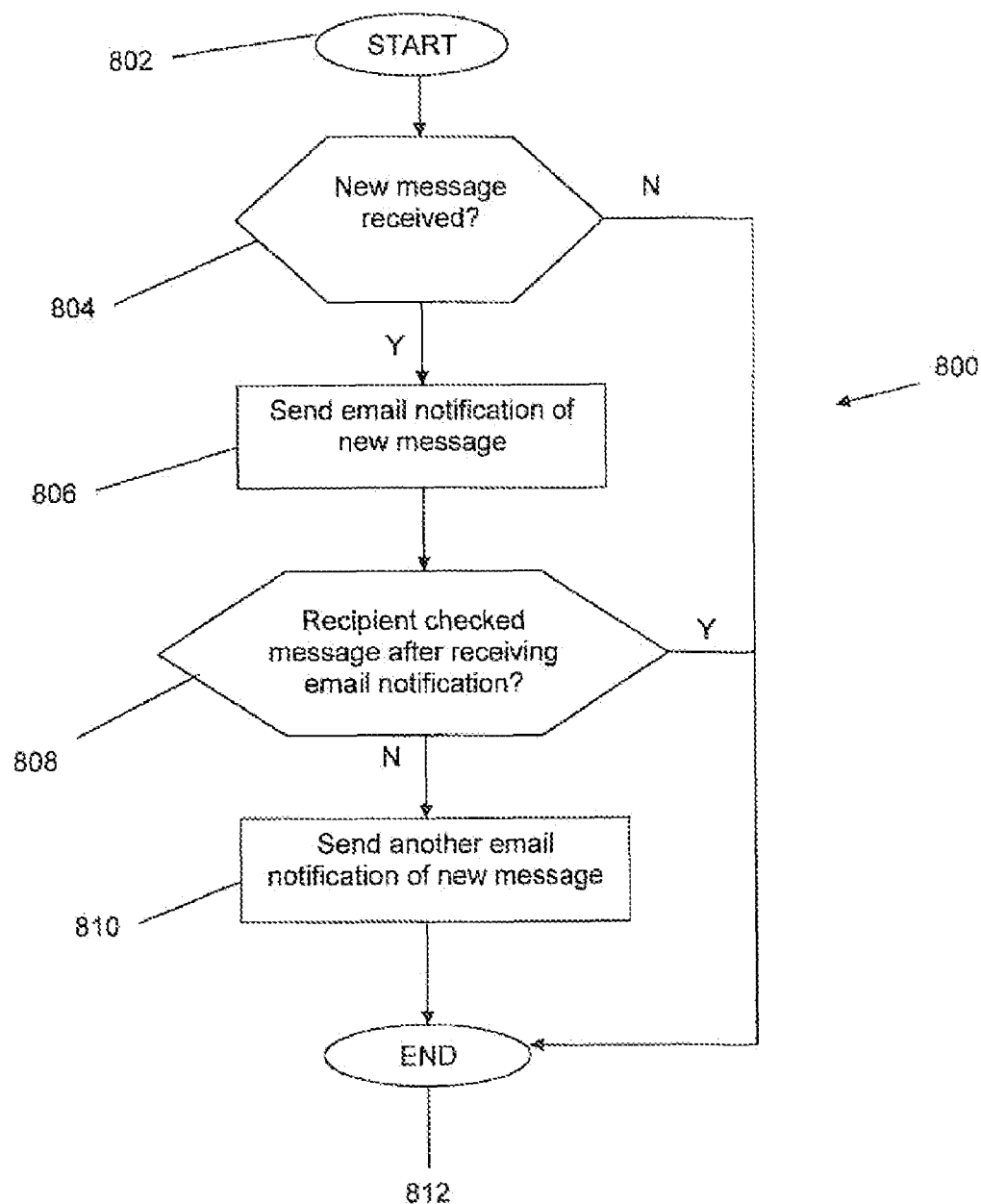

Referring now additionally to the flowchart 800 of FIG. 8, another method aspect according to the present invention is now described in greater detail. From the start (Block 802), it is determined whether or not a new message has arrived at Block 804. If it is determined at Block 804 that a new message has arrived, then an e-mail notification is sent to the user at Block 806 informing the user of a new message. If it is determined at Block 804 that no new message has arrived, then the method is ended at Block 812. At Block 808, it is determined whether the recipient has checked the message after receipt of the notification e-mail. If it is determined that the recipient has checked the message, then the method is ended at Block 812. If, however, it is determined that the recipient has not checked the message after receiving the notification e-mail, then another notification e-mail is sent to the user at Block 810. Thereafter, the method is ended at Block 812.

The present invention advantageously provides the user the ability to push and pull customized picture, audio and video files safely and virus free to and from wireless mobile devices. In the case of audio and pictures, a user may advantageously chose to send a picture and audio, or a picture with overlaid audio. The applet allows for default for device specific compression of picture, audio and video content for minimum bandwidth utilization during the transfer process. The present invention also advantageously has the ability to run as a thin applet on PCs while taking advantage of contact lists, such as those found in Outlook and Eudora to create, edit, send, block and/or receive audio and video ring tones and other content. The applet of the present invention also advantageously allows the user to customize how, when and from whom to receive a specific type of content. Further, the applet of the present invention advantageously has the ability to run as a thin applet on media enabled wireless devices and take advantage of wireless features while simultaneously allowing flexibility to create, edit, send, block and/or receive audio and video content, such as ring tones.

The solution to various issues provided by the applet of the present invention is advantageously a software solution that relies on security mechanisms already present in wireless networks and secure web ports. The invention is simply an applet that allows the user to take advantage of the existing features of wireless networks and networking portals to interact with friends and family. The solution provided by the applet of the present invention is advantageously independent of radio-accessed technology, operating systems and computer platforms. The solution provided by the applet of the present invention also advantageously uses file compression and management mechanisms already present in web portals and wireless networks.

Figure 9:
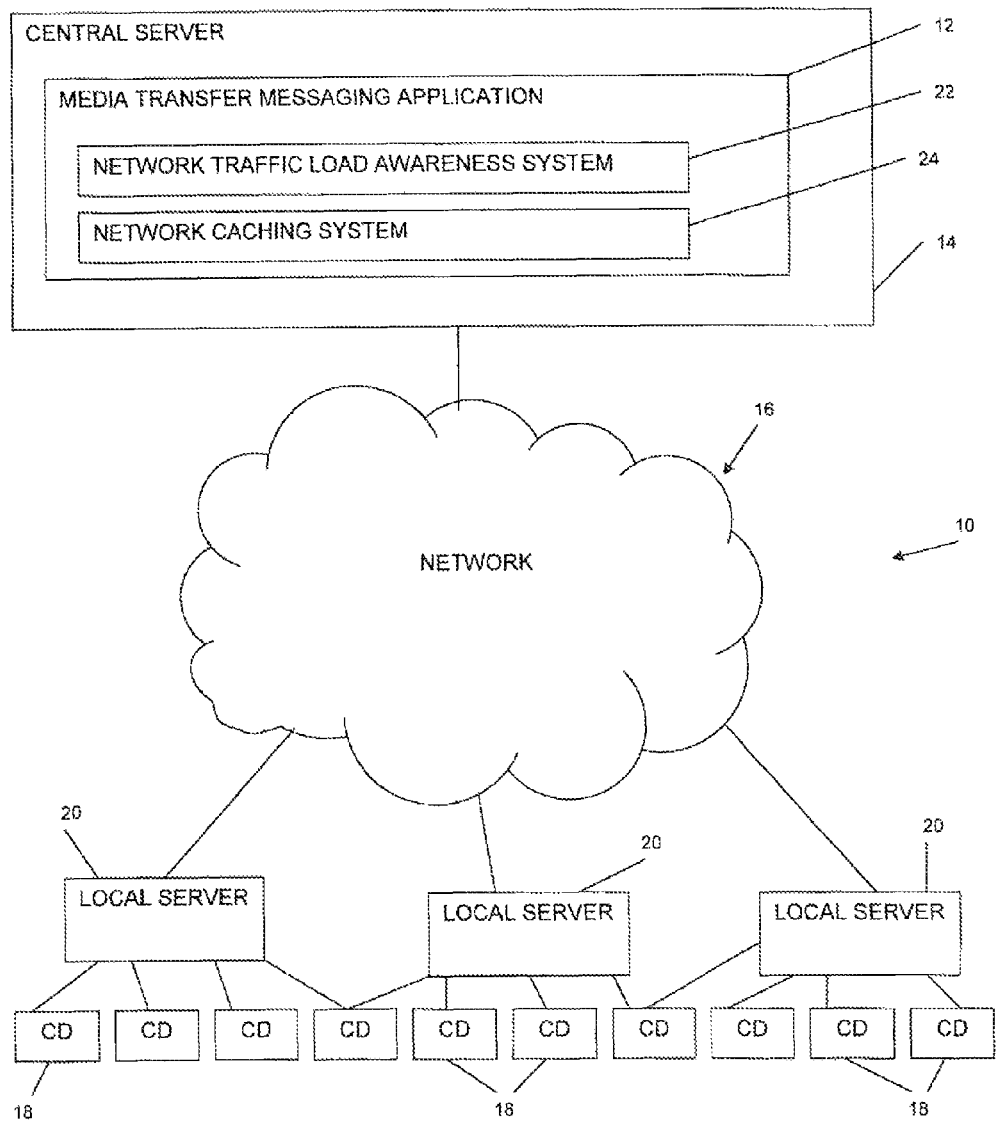
Figure 10:
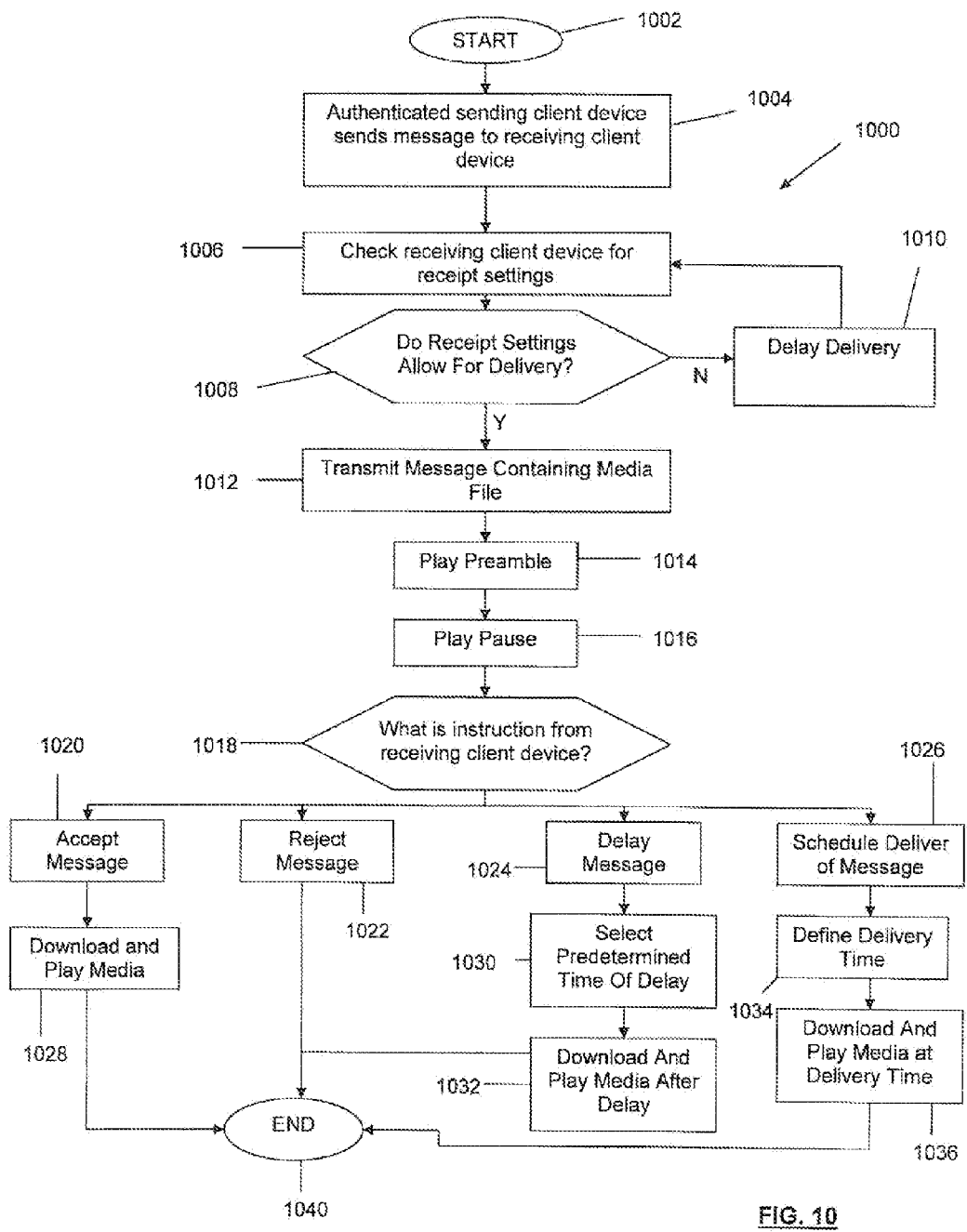

Referring now additionally to FIGS. 9-15, additional features of a media transfer system 10 according to the present invention are now described in greater detail. The media transfer system 10 illustratively includes a media transfer messaging application 12 that is to be stored on a central server 14 which is in communication with a network 16. The media transfer messaging application 12 is adapted to be downloaded by a plurality of client devices 18 which are also in communication with the network 16. Each of the client devices 18 having the media transfer messaging application 12 stored thereon are able to transmit messages containing media between one another via the network 16. More specifically, and as perhaps best illustrated in FIG. 9, each of the client devices 18 are preferably connected to the network 16 via a local server 20. The schematic diagram illustrated in FIG. 9 shows three local servers 20 connected to the network 16, but those having skill in the art will appreciate that an infinite number of local servers may be connected to the network. Similarly, each local server 20 has a plurality of client devices 18 connected thereto. Those skilled in the art will appreciate that a client device 18 may connect to multiple local servers 20 to become connected to the network 16. Further, an infinite number of client devices 18 may be connected to the network 16 via the local servers 20.

Due to the plurality of client devices 18 may be defined as a receiving client device when receiving a message containing media and a sending client device when sending a message containing media. The sending client device may be authenticated prior to sending a message containing media. A sending client device that has been authenticated is defined as an authenticated sending client device. After having had the benefit of reading this disclosure, those skilled in the art will appreciate that authenticating the sending client device advantageously enhances security of users of the media transfer messaging application 12. More specifically, authenticating the sending client device may advantageously insure that a user is using the media transfer messaging application 12 pursuant to pre-determined conditions.

Media sent from the sending client device using the media transfer messaging application 12 according to the present invention is received by the receiving client device as a message. The receiving client device is adapted to accept, reject, delay or schedule delivery of the message containing the media. Accordingly, the user of the receiving client device may advantageously accept or reject a particular message, or may also advantageously only accept delivery of the message containing the media at a convenient time.

The receiving client device is adapted to send a message received from the sending client device to at least one receiving client device. In other words, a message containing media received by a receiving client device may be forwarded to other client devices 18. This advantageously allows a user that has received a message containing media to forward that message to other client devices having the media transfer messaging application 12 stored thereon. The user may select to forward the message containing the media to a contact in a contact database that is accessible using the client device 18, or may set up a new contact to forward the message containing the media 2.

The media transfer messaging application 12 according to the present invention also includes a network traffic load awareness system 22. The network traffic load awareness system 22 advantageously monitors the traffic of media being transmitted on the network 16 to insure that the network 16 is not overly congested, and to also optimize delivery times of messages containing media. More specifically, and as will be discussed in greater detail below, the network traffic load system 22 may delay transmission of a message containing media until network congestion has decreased so that the delivery time of the media is optimized.

As will also be discussed in greater detail below, the message containing media may include a preamble and a main body. The preamble may, for example, be an introduction, a thumbnail photo showing a picture of the sender, or any other type of file that may be used to identify the sender or provide a preview of the media being transmitted in the message. The main body of the message is preferably the media file that is being transmitted therewith. For example, the main body may be text file, a picture file, an audio file, a video file, or any other type of media file as understood by those skilled in the art.

The preamble and the main body of the message are separated by a pause. The pause preferably has a predetermined time link. The pause in the message between the preamble and the main body advantageously allows a user of the receiving client device the ability to accept, reject, delay or schedule a delivery of the message during the pause. In other words, the user of the receiving client device is provided an opportunity, i.e., the predetermined length of time of the pause, to make a determination as to whether or not the media and the message should be downloaded and played. This advantageously prevents the media and the message from being played at an inconvenient time to the user of the receiving client device. The media may, for example, be audio, video or text. The present invention contemplates, however, that the media may be any combination of audio, video, picture and text.

The plurality of client devices 18 may be any type of client device. For example, the client device may be a computer, a wireless device adapted to be connected to a network 16, a public exchange telephone, or a social networking portal. When the client device 18 is a computer, a user may transmit any type of media stored on the computer to other client devices. Similarly, a user of a wireless device adapted to be connected to the network 16 may transmit media stored on the wireless device, i.e., on the internal memory of the wireless device or on a memory card carried by the wireless device, to any other client device 18 having the media transfer messaging application 12 stored thereon. This is similar for a public exchange telephone and social networking portals. With respect to the client device 18 being a social networking portal, a user may transmit media posted on their social networking portal, i.e., Facebook page, MySpace page, etc., to any client device 18 having a media transfer messaging application 12 stored thereon. Accordingly, the media transfer system 10 according to the present invention advantageously allows various client devices 18 to transfer messages containing media there between. This is advantageous in that the source of the media may be any source, i.e., any client device such as a computer, a wireless device, a public exchange telephone, a social networking portal, etc., and may have any format, i.e., .jpg, .mpg, .wav, .avi, etc.

As has been previously discussed, the media in the message may be adapted to be used as a ring tone or a video tone used by the receiving client device. Accordingly, by allowing the media being transmitted in the message to be used as a ring tone or a video tone on the receiving client device, the sending client device advantageously is able to determine the type of ring tone to be played on the receiving client device. Accordingly, the media transfer messaging application of the media transfer system 10 according to the present invention advantageously allows for a sender to customize a ring tone or a video tone being received by the receiving client device when receiving a message from the sender.

The media in the message received by the receiving client device may be stored on an internal memory on the receiving client device. More specifically, the user of the receiving client device may choose to store the media in the message locally, i.e., on the receiving client device, or may even choose to store the media on a memory in communication with the network 16. For example, the user may choose to store the media file on a server 14, 20, of the network 16. With respect to social networking portals being used as the client device 18, the receiver may choose to associate the media with their social networking portal, in which case it is likely stored on a server associated with the social networking website. Those skilled in the art will also appreciate that the media received in the message by the client receiving device may be stored on removable media, i.e., an external hard drive, a pin drive, a server, or other types of removable and remote storage devices. The receiving client device may be adapted to block, delay or schedule incoming messages based on a predetermined parameter. This advantageously allows the user of the receiving client device the opportunity to determine which messages, if any, to receive, as well as the times convenient to receive them, and the types of messages that the user may wish to receive, or block. Accordingly, the receiver of the client device may select to reject all messages containing media. Further, the user of the receiving client device may select to only receive messages containing media from predetermined senders. More specifically, the present invention contemplates that the user of the receiving client device may set up groups of approved senders from which the receiving client device may receive messages containing media. The present invention also contemplates that the user of the receiving client device may only accept messages having a predetermined size. This advantageously prevents media having a large file size from being transmitted to the receiving client device to prevent congestion of the bandwidth of the receiving client device. The present invention further contemplates that the user of the receiving client device may define parameters blocking messages containing media having certain types of content, i.e., adult content. After having had the benefit of reading this disclosure, those skilled in the art will appreciate that the user of the receiving client device may set up an infinite number of parameters to block, receive, delay or schedule receipt of messages containing media.

The media transfer messaging application 12 of the media transfer system according to the present invention advantageously determines if the receiving client device is available to receive a message containing media prior to delivering the message to the receiving client device. The present invention contemplates that the media transfer messaging application 12 not only checks availability of the receiving client device for receiving a message, but also checks whether or not the receiving client device is able to receive a message. In other words, although a receiving client device may be available to receive a message, the receiving client device may not be able to receive a message for various reasons, such as, for example, the receiving client device is not within network range, or the user of the receiving client device has set a predetermined parameter so that the receiving client device is not able to receive a message containing media. In a case where the media transfer messaging application 12 has determined that the receiving client device is not available to receive a message, the media in the message may be stored until the receiving client device is available to receive the message. More specifically, the media may be stored on an internal memory of the sending client device, on a server 14, 20 of the network 16, or in any other ways understood by those skilled in the art.

As described above, the media transfer system 10 according to the present invention also includes a network caching system 24. More specifically, the network 16 may include a central server 14 in a plurality of local servers 20 in communication with the central server via the network 16. The plurality of local servers 20 may be deployed over a plurality of geographical locations of interest. In other words, and with reference to the United States, a local server may be deployed to serve the Southeast region of the U.S., the Northeast region of the U.S., the Midwest region of the U.S., etc. The network caching system 24 of the media transfer messaging application 12 may be used to monitor geographical activity of a predetermined media item being transferred between the plurality of client devices 18. More specifically, the network caching system 24 may store the predetermined media item on one of the plurality of local servers 20 for a predetermined amount of time based on the activity of the predetermined media item being transferred between the plurality of client devices 18 in a predetermined geographical location. For example, and as will be discussed in greater detail below, if a predetermined media item is becoming popular within a predetermined geographical location, and is being transferred between multiple client devices 18, the network caching system 24 according to the present invention may advantageously store a copy of the predetermined media item on the local server so that the client devices 18 transferring the predetermined media item do not have to download the media item from the central server thereby decreasing congestion on the network 16. Referring now additionally to the flowchart 1000 illustrated in FIG. 10, method aspects of the present invention are now described in greater detail. From the start 1002, an authenticated client sending device sends a message containing media to a receiving client device at Block 1004. At Block 1006, the receiving client device is checked for receipt settings. At Block 1008, it is determined whether or not the receipt settings for the receiving client device allow for delivery of the message containing the media. If it is determined at Block 1008 that the receipt settings do not allow for delivery of the message containing the media, then delivery of the message containing the media is delayed at Block 1010, and the receipt settings are again checked at Block 1006.

If, however, it is determined at Block 1008 that the receipt settings allow for delivery of the message containing media, then the message containing the media file is transmitted at Block 1012. At Block 1015, the preamble of the message is played. At Block 1016, the pause between the preamble and the main body is played. At Block 1018, instruction for receipt of the message from the receiving client device is received.

More specifically, the instruction at Block 1018 may be to accept the message (Block 1020), reject the message (Block 1022), delay delivery of the message (Block 1024), or schedule a delivery of the message (Block 1026). If the instruction from the receiving client device is to accept the message at Block 1020, then the media file in the message is downloaded and played at Block 1028, and the method is ended at Block 1040. If the receipt instruction from the receiving client device is to reject the message at Block 1022, then the method is ended at Block 1040.

If the receipt instruction from the receiving client device is to delay delivery of the message containing the media at Block 1024, then a predetermined time of the delay is selected at Block 1030. At Block 1032, the media in the message is downloaded and played after the predetermined delay, and the method is ended at Block 1040. If the instruction from the receiving client device is to schedule delivery of the message at Block 1026, then the delivery time is defined at Block 1034, and the media in the message is downloaded and played at the delivery time at Block 1036. Thereafter, the method is ended at Block 1040.

Figure 11:
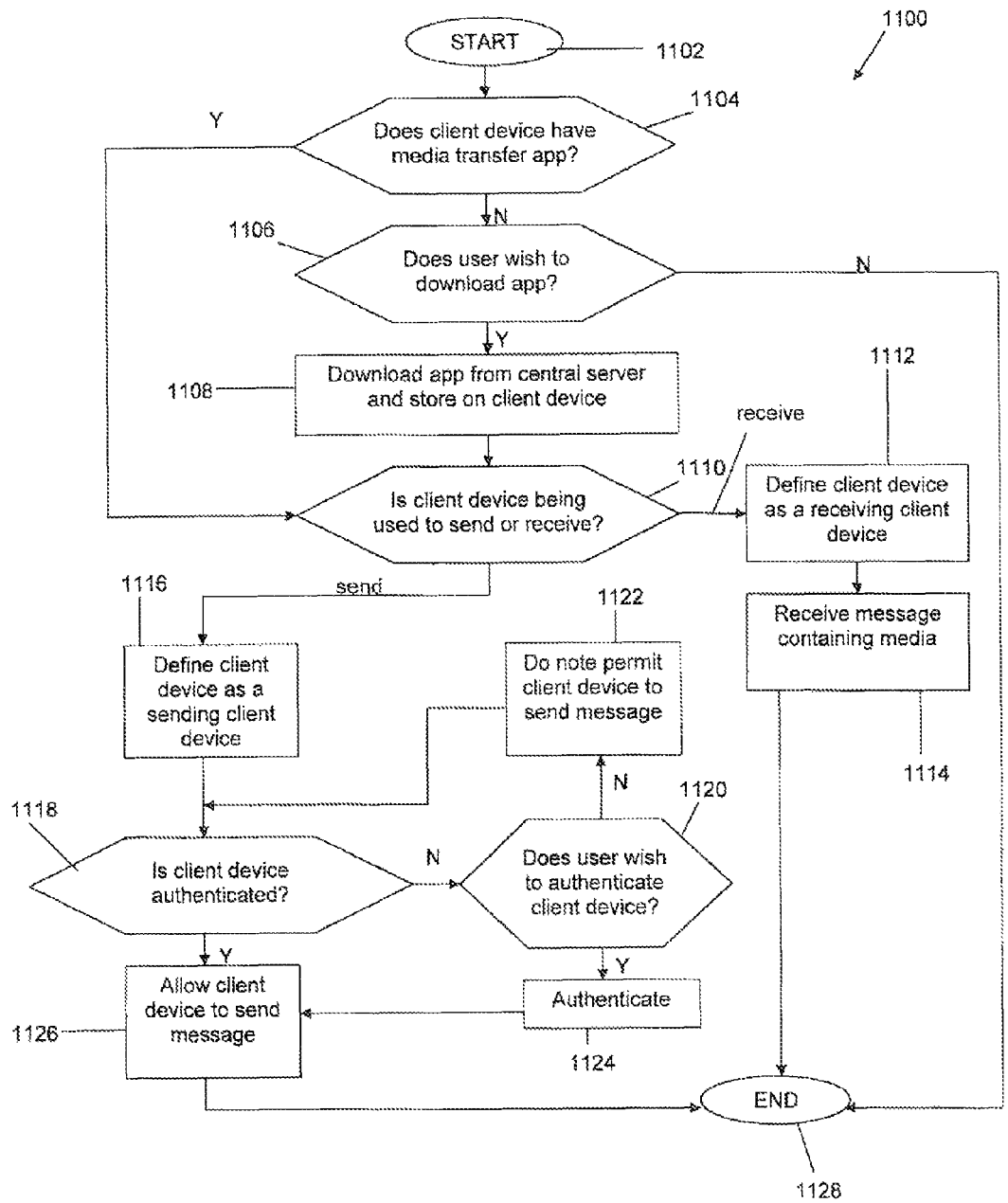

Referring now additionally to the flowchart 1100 illustrated in FIG. 11, yet another method aspect of the present invention is now described in greater detail. From the start (Block 1002), it is determined that Block 1104 whether or not the client device has the media transfer messaging application stored thereon. If it is determined at Block 1104 that the client device does not have the media transfer messaging application stored thereon, then it is determined at Block 1106 if the user wishes to download the media transfer messaging application. If it is determined at Block 1106 that the user does not wish to download the media transfer messaging application, then the method is ended at Block 1128. If, however, it is determined at Block 1106 that the user does wish to download the media transfer messaging application, then the media transfer messaging application is downloaded from the central server and stored on the client device at Block 1108. Thereafter, and if it is determined at Block 1104 that the client device already has the media transfer messaging application stored thereon, then it is determined at Block 1110 whether or not the client device is being used to send or receive a message containing media.

If it is determined at Block 1110 that the client device is being used to receive a message containing media, then the client device is defined as a receiving client device at Block 1112. At Block 1114, the message containing media is received, and the method is ended at Block 1128.

If, however, it is determined at Block 1110 that the client device is being used to send a message containing media, then the client device is defined as a sending client device at Block 1116. At Block 1118, it is determined whether or not the client device is authenticated. If it is determined that Block 1118 that the client device is authenticated, then the authenticated client device is permitted to send the message at Block 1126 and the method is ended at Block 1128.

If, however, it is determined at Block 1118 that the client device is not an authenticated client device, then it is determined at Block 1120 whether or not the user wishes to authenticate the client device. If it is determined at Block 1120 that the user does not wish to authenticate the client device, then the user is not allowed to transmit the message containing media at Block 1122, and it is again determined at Block 1118 whether or not the client device is authenticated. If, however, it is determined at Block 1120 that the user wishes to authenticate the client device, then the client device is authenticated at Block 1124, and the client device is thereafter allowed to transmit the message containing the media at Block 1126.

Figure 12:
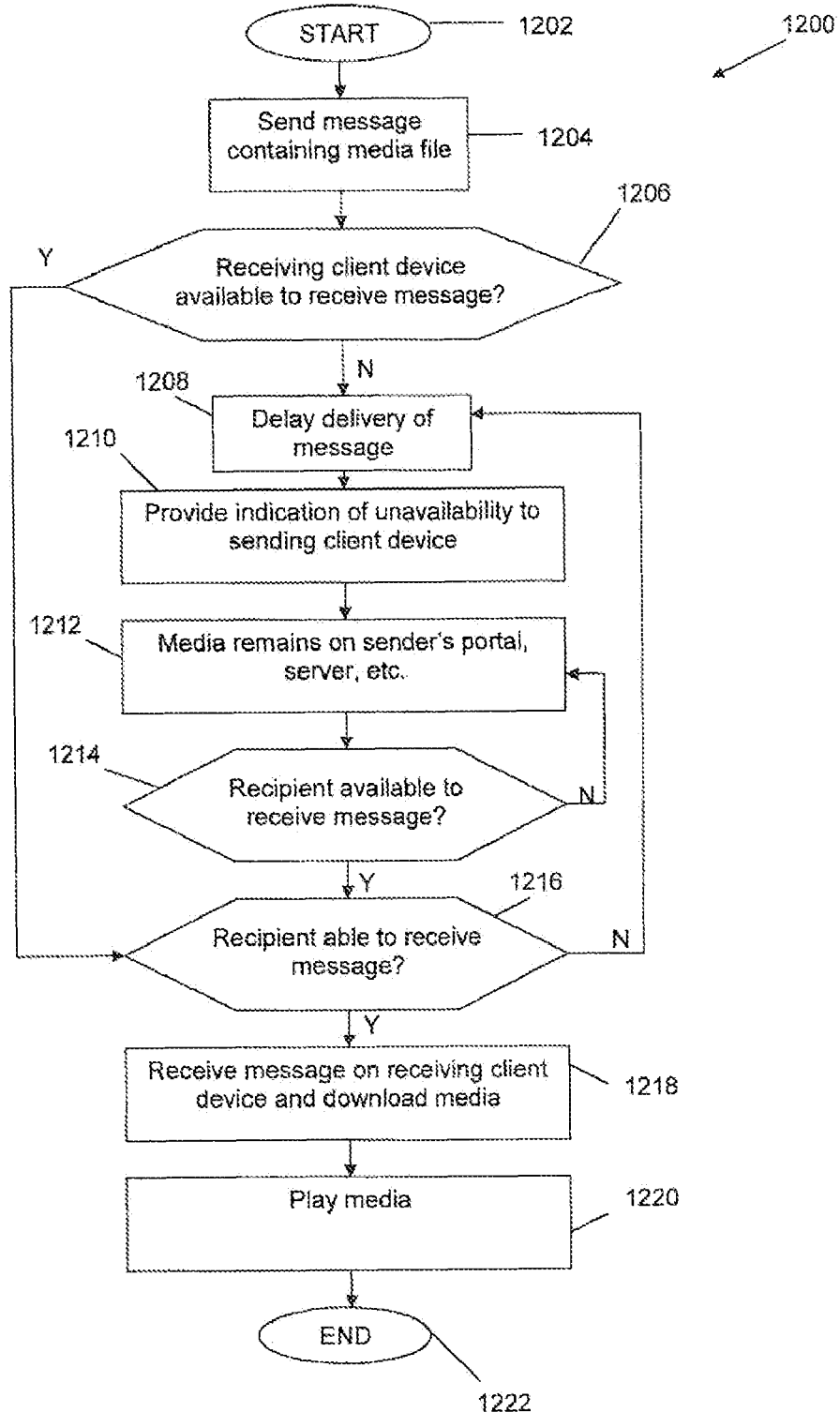

Referring now additionally to the flowchart 1200 illustrated in FIG. 12, yet another method aspect of the present invention is now described in greater detail. From the start (Block 1202), a message containing a media file is sent from a sending client device at Block 1204. At Block 1206, it is determined whether or not the receiving client device is available to receive the message. If it is determined at Block 1206 that the receiving client device is not available to receive the message, then delivery of the message is delayed at Block 1208. At Block 1210, an indication is provided to the sending client device that the receiving client device is unavailable. At Block 1212, the media in the message remains on the sender's portal or the server of the wireless network, etc., pending availability of the receiving client device to receive the message contained in the media. At Block 1214, it is determined whether the recipient is available to receive the message. If it is determined at Block 1214 that the recipient is not available to receive the message, then the media remains on the sender's portal or server of the wireless network, etc., at Block 1212.

If it is determined that the receiving client is available to receive the message at either Block 1206, or at Block 1214, then it is determined at Block 1216 whether or not the receiving client device is able to receive the message. If it is determined at Block 1216 that the receiving client device is not able to receive the message, then delivery of the message is delayed at Block 1208. If, however, it is determined at Block 1216 that the receiving client device is able to receive the message containing the media, then the message containing the media is received by the receiving client device and the media is downloaded at Block 1218. At Block 1220, the media is played, and at Block 1222, the method is ended.

Figure 13:
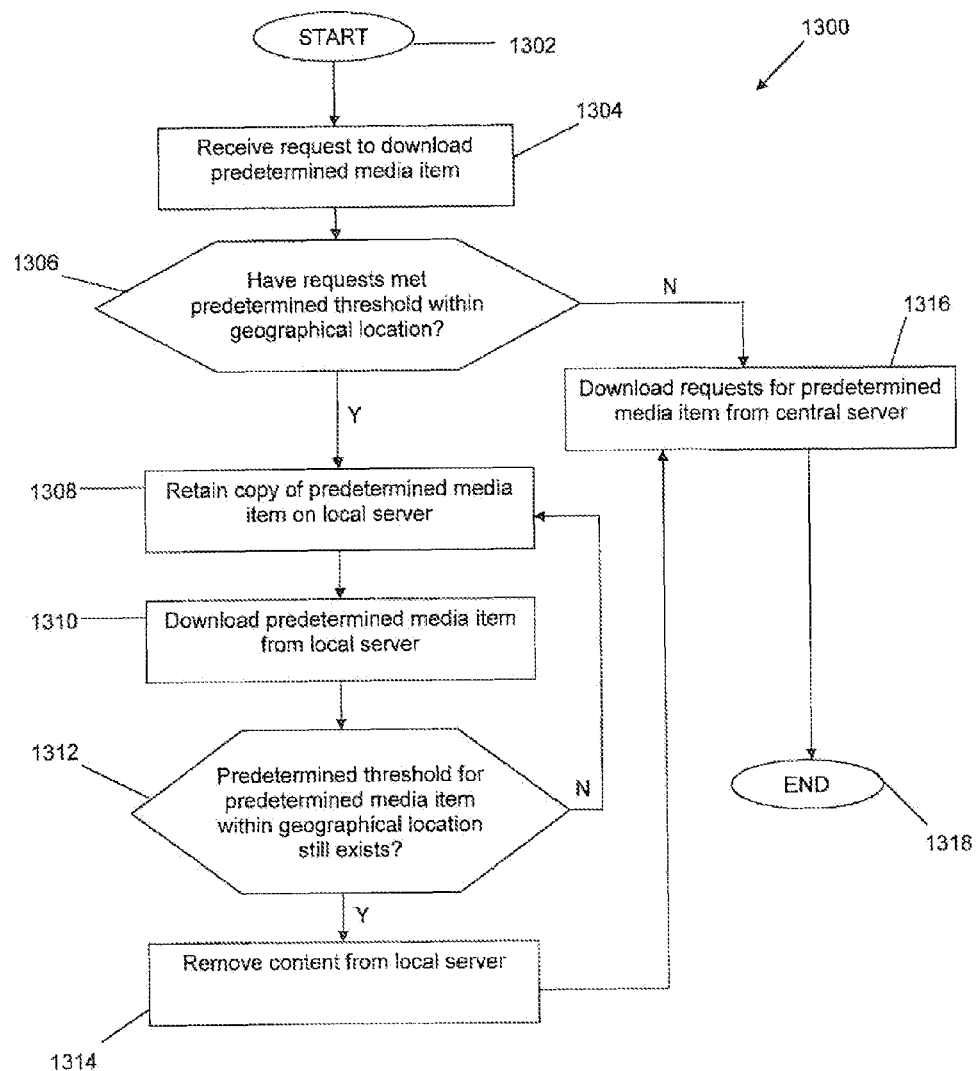

Referring now additionally to the flowchart 1300 illustrated in FIG. 13, another aspect according to the present invention is now described in greater detail. From the start (Block 1302), the requested download, a predetermined media item is received at Block 1304. At Block 1306, it is determined whether or not the number of requests to download a predetermined media item meets a predetermined threshold within a geographical location. If it is determined that the number of requests to download the predetermined media item have not met the predetermined threshold at Block 1306, then the predetermined media item is downloaded from the central server at Block 1316, and the method is ended at Block 1318.

If, however, it is determined at Block 1306 that the number of requests to download the predetermined media item has exceeded a predetermined threshold within a geographical location, then a copy of the predetermined media item is retained on a local server of the network at Block 1308. At Block 1310, the predetermined media item is downloaded from the local server. At Block 1312, it is determined whether or not the number of requests to download the predetermined media item still exceeds the predetermined threshold within the geographical location. If it is determined at Block 1312 that the number of requests to download the predetermined media item still exceeds the predetermined threshold, then the copy of the predetermined media item continues to be retained at the local server at Block 1308. If, however, it is determined at Block 1312 that the predetermined threshold is not met, then the content is removed from the local server at Block 1314 and the predetermined media item is thereafter downloaded from the central server at Block 1316. The method is ended at Block 1318.

Figure 14:
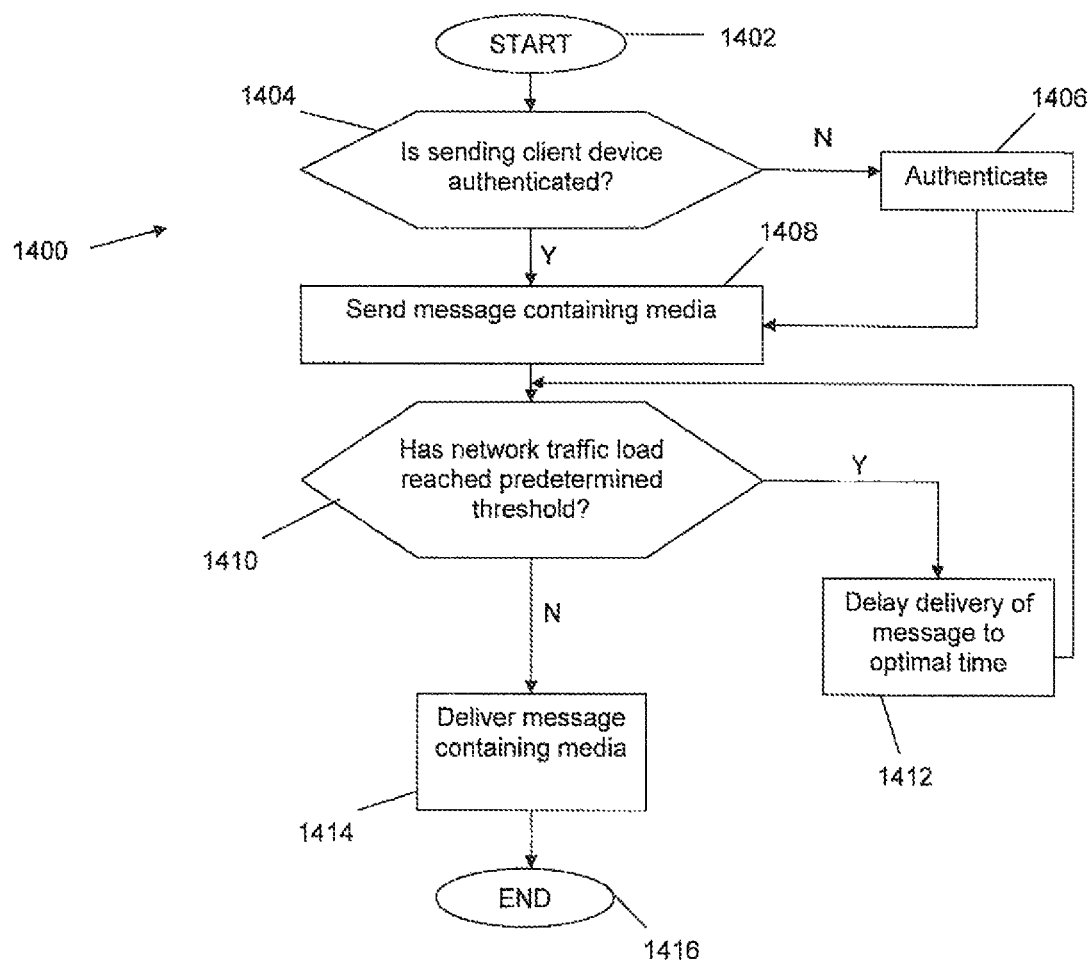

Referring now additionally to the flowchart 1400 of FIG. 14, still another method aspect of the present invention is described in greater detail. From the start (Block 1402), it is determined whether or not the sending client device is authenticated at Block 1404. If it is determined at Block 1404 that the sending client device is not authenticated, then the sending client device is authenticated at Block 1406. Thereafter, if it is has been determined at Block 1404 that the sending client device is authenticated, then the message containing the media is transmitted at Block 1408.

At Block 1410, it is determined whether or not the network traffic load has reached a predetermined threshold. If it is determined at Block 1410 that the network traffic load has reached a predetermined threshold, then delivery of the message containing the media is delayed until an optimum delivery time at Block 1412. Thereafter, it is reassessed at Block 1410 whether or not the traffic load has reached a predetermined threshold. If it is determined, however, at Block 1410, that the network traffic load has not reached the predetermined threshold, then the message containing the media may be transmitted at Block 1414, and the method may be ended at Block 1416.

Figure 15:
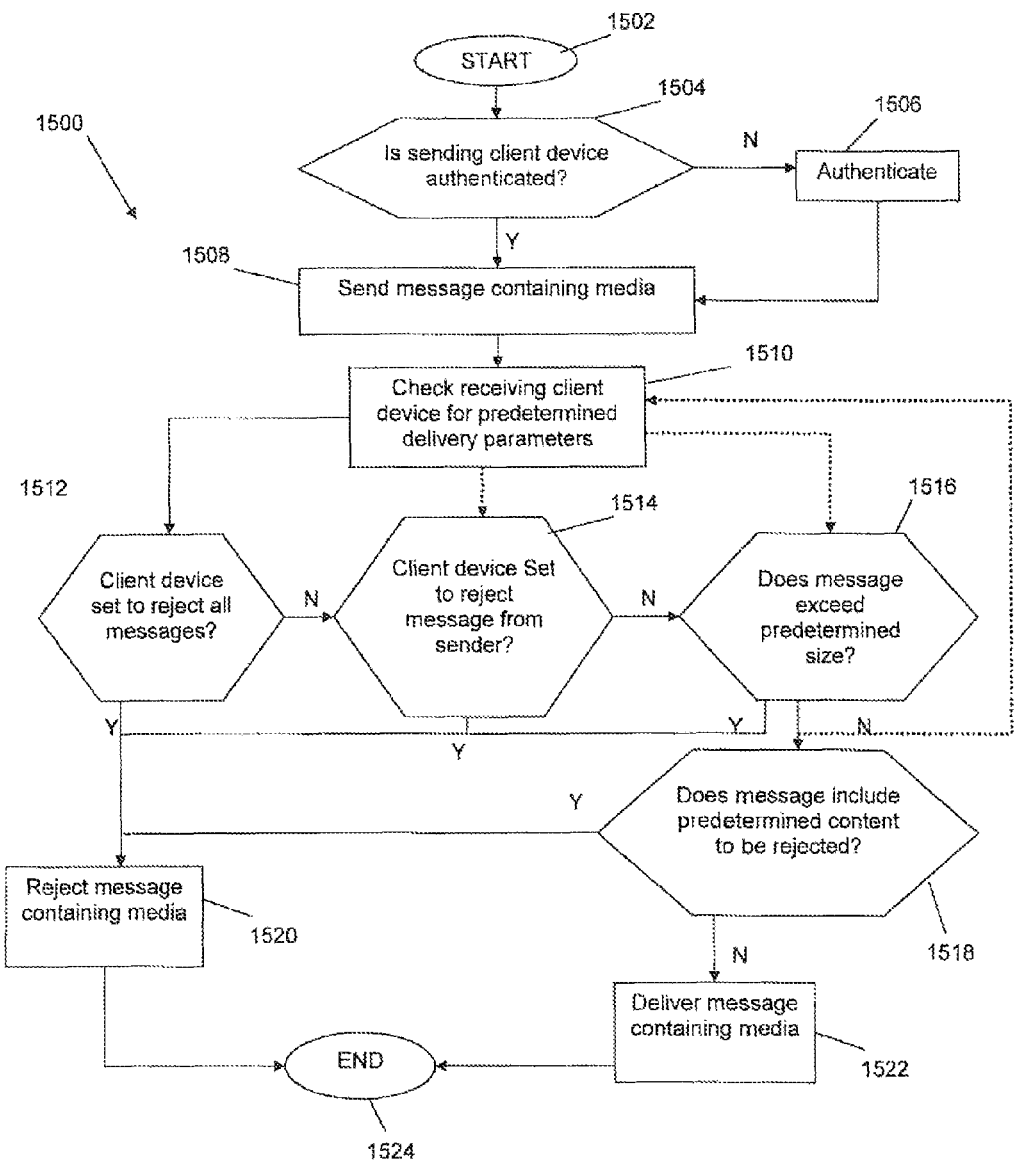

Referring now additionally to the flowchart 1500 illustrated in FIG. 15, another method according to the present invention is now described in greater detail. From the start (Block 1502), it is determined whether or not the sending client device is authenticated at Block 1504. If it is determined at Block 1504 that the sending client device has not been authenticated, then the sending client device is authenticated at Block 1506. Thereafter, and if it has been determined at Block 1504, that the sending client device has been authenticated, then the message containing media may be sent from the sending client device at Block 1508.

At Block 1510, the receiving client device is checked for predetermined parameters regarding delivery. At Block 1512, it is determined whether or not the receiving client device has been set to reject all messages. If it is determined at Block 1512, that the receiving client device has been set to reject all messages, then the message is rejected at Block 1520, and the method is ended at Block 1524. If, however, it is determined whether or not the sending client device has not been set to reject all messages, then it is determined at Block 1514 whether or not the client device has been set to reject the message from the sending client device. If it is determined at Block 1514 that the receiving client device has been set to reject all messages from the sending client device, then the message is rejected at Block 1520, and the method is ended at Block 1524.

If, however, it is determined at Block 1514 that the receiving client device has not been set to reject messages from the sending client device, then it is determined at Block 1516 whether or not the message containing the media exceeds a predetermined size. If it is determined at Block 1516 that the message containing the media exceeds a predetermined size, then the message is rejected at Block 1520 and the method is ended at Block 1524.

If, however, it is determined at 1516 that the message does not exceed a predetermined size, then it is determined at Block 1518 whether or not the media in the message includes predetermined content to be rejected. If it is determined at Block 1518 that the media in the message contains predetermined content to be rejected, then the message is rejected at Block 1520, and the method is ended at Block 1524. If, however, it is determined at Block 1518 that the message does not include predetermined content to be rejected, then the message is delivered at Block 1522, and the method is ended at Block 1524. Those skilled in the art will appreciate that the decisions made at Blocks 1512, 1514, 1516 and 1518 may be individually made from Block 1510, and do not necessarily need to be made in the particular order illustrated. Those skilled in the art will also appreciate, after having had the benefit of this disclosure, that any combination of the decisions made in Blocks 1512, 1514, 1516 and 1518 may be made after the predetermined parameters of the receiving client device are checked at Block 1510.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A media transfer system on at least one wireless network that relies on at least one security mechanism present on the at least one wireless network, the media transfer system comprising:
    a media transfer messaging application stored on a central server to be downloaded by a plurality of client devices and stored thereon, the plurality of client devices in communication with the at least one wireless network;
    wherein the plurality of client devices having the media transfer messaging application stored thereon are enabled to transmit media between one another via the at least one wireless network;
    wherein the media to be transmitted by the media transfer messaging application is selected from the group consisting of audio, video, pictures or text;
    wherein each of the plurality of client devices are defined as a receiving client device when receiving media and a sending client device when sending media;
    wherein the sending client device is authenticated prior to sending media to be defined as an authenticated sending client device;
    wherein the media transfer messaging application is configured to transmit media to the receiving client device that is consistent with capabilities of the receiving client device;

wherein at least one of the plurality of client devices is a handheld media enabled device;

wherein media sent from the sending client device using the media transfer messaging application is received by the receiving client device as a message, and wherein the message provides the receiving client device with an option to accept, reject, delay or schedule delivery of the message;

wherein the receiving client device is adapted to send a message received from a sending client device to at least one receiving client device;

wherein the media transfer messaging application comprises a network traffic load awareness system to determine optimal delivery times of the message;

wherein the media transfer messaging application relies on the security mechanism present on the at least one wireless network and that is in communication with the sending client device so that the security measure ensures authentication of the sending client device and the media to be transferred by the sending client device, wherein authentication is performed on the at least one wireless network;

wherein the media to be transferred is automatically optimized for transmission with respect to the sending client device and the receiving client device;

wherein the media transfer messaging application comprises at least one security measure that conforms at least one setting of the sending client device and at least one setting of the receiving client device and that ensures that media to be transferred between the sending client device and the receiving client device meets requirements of the at least one setting of both the sending client device and the receiving client device;

wherein the message includes a preamble and a main body, and wherein the preamble provides the receiving client device with the option to accept, reject, delay or schedule delivery of the message;

wherein the preamble and the main body are separated by a pause; and wherein, upon selection of the option to delay or schedule delivery of the message, the media transfer messaging application prompts the receiving client device for at least one of a predetermined length of time to wait before delivering the message and a preset time at which to deliver the message.

2. A media transfer system according to claim 1 wherein the media is selected from the group consisting of audio, picture, video or text.

3. A media transfer system according to claim 1 wherein each of the plurality of client devices is selected from the group consisting of a computer, a wireless device adapted to be connected to a network, a public exchange phone or a social networking portal.

4. A media transfer system according to claim 1 wherein the media in the message is selected from the group consisting of a ringtone or a videotone received by the receiving client device so that the sending client device determines the type of ringtone or videotone to be played on the receiving client device.

5. A media transfer system according to claim 1 wherein the media received by the receiving client device is stored on an internal memory on the receiving client device.

6. A media transfer system according to claim 1 wherein the media transfer messaging application interfaces with a contacts file stored on each of the plurality of client devices to transfer the message to at least one selected contact.

7. A media transfer system according to claim 1 wherein the receiving client device is adapted to block, delay or schedule incoming messages based on a parameter.

8. A media transfer system according to claim 7 wherein the parameter is selected from the group consisting of all messages, messages from at least one sending client device, messages having a predetermined type of content or messages having greater than a predetermined size.

9. A media transfer system according to claim 1 wherein the media transfer messaging application determines if the receiving client device is available to receive the message prior to delivering the message to the receiving client device.

10. A media transfer system according to claim 9 wherein the media in the message is stored on at least one of an internal memory of the sending client device and on the at least one wireless network while the media transfer messaging application determines whether or not the receiving client device is available to receive the message.

11. A media transfer system according to claim 1 wherein the at least one wireless network includes a central server and a plurality of local servers in communication with the central server, and wherein the plurality of local servers are deployed over a plurality of geographical locations of interest.

12. A media transfer system according to claim 11 wherein the media transfer messaging application includes a network caching system to monitor geographical activity of a media item being transferred between the plurality of client devices.

13. A media transfer system according to claim 12 wherein the network caching system stores the media item on one of the plurality of local servers for an amount of time based on the activity of the media item being transferred between the plurality of client devices in a geographical location.

14. A media transfer system according to claim 1 wherein the media being transferred is a voicemail, and wherein the voicemail is transferred from the sending client device to at least one receiving client device.

15. A media transfer system according to claim 1 wherein the receiving client device is again prompted with the preamble upon an attempt to deliver the message in response to an initial selection of the option to delay or schedule delivery of the message, and wherein the preamble again provides the receiving client device with the option to accept, reject, delay or schedule receipt of the message.

16. A media transfer system on at least one wireless network that relies on at least one security mechanism present on the at least one wireless network the media transfer system comprising:

a media transfer messaging application stored on a central server to be downloaded by a plurality of client devices and stored thereon, the plurality of client devices in communication with the at least one wireless network;

wherein the plurality of client devices having the media transfer messaging application stored thereon are enabled to transmit media between one another via the at least one wireless network;

wherein the media to be transmitted by the media transfer messaging application is selected from the group consisting of audio, video, pictures or text;

wherein each of the plurality of client devices are defined as a receiving client device when receiving media and a sending client device when sending media;

wherein the sending client device is authenticated prior to sending media to be defined as an authenticated sending client device;

wherein the media transfer messaging application is configured to transmit media to the receiving client device that is consistent with capabilities of the receiving client device;

wherein media sent from the sending client device using the media transfer messaging application is received by the receiving client device as a message, and wherein the message provides the receiving client device with an option to accept, reject, delay or schedule delivery of the message;

wherein the media transfer messaging application interfaces with a contacts file stored on each of the plurality of client devices to transfer the message to at least one selected contact;

wherein the at least one wireless network includes a central server and a plurality of local servers in communication with the central server;

wherein the plurality of local servers are deployed over a plurality of geographical locations of interest;

wherein the media transfer messaging application includes a network caching system to monitor geographical activity of a media item being transferred between the plurality of client devices;

wherein the media transfer messaging application relies on the security mechanism present on the at least one wireless network and that is in communication with the sending client device so that the security mechanism ensures authentication of the sending client device and the media to be transferred by the sending client device, wherein authentication is performed on the at least one wireless network;

wherein the media to be transferred is automatically optimized for transmission with respect to the sending client device and the receiving client device;

wherein the media transfer messaging application comprises at least one security measure that conforms at least one setting of the sending client device and at least one setting of the receiving client device and that ensures that media to be transferred between the sending client device and the receiving client device meets requirements of the at least one setting of both the sending client device and the receiving client device;

wherein the message includes a preamble and a main body separated by a pause, and wherein the preamble provides the receiving client device with the option to accept, reject, delay or schedule delivery of the message; and wherein, upon selection of the option to delay or schedule delivery of the message, the media transfer messaging application prompts the receiving client device for at least one of a predetermined length of time to wait before delivering the message and a preset time at which to deliver the message.

17. A media transfer system according to claim 16 wherein each of the plurality of client devices is selected from the group consisting of a computer, a wireless device adapted to be connected to a network, a public exchange phone or a social networking portal.

18. A media transfer system according to claim 16 wherein the media in the message is selected from the group consisting of a ringtone or a videotone received by the receiving client device so that the sending client device determines the type of ringtone or videotone to be played on the receiving client device.

19. A media transfer system according to claim 16 wherein the receiving client device is adapted to block incoming messages based on a parameter; and wherein the parameter is selected from the group consisting of all messages, messages from at least one sending client device, messages having a predetermined type of content or messages having greater than a predetermined size.

20. A media transfer system according to claim 16 wherein the media transfer messaging application determines if the receiving client device is available to receive the message prior to delivering the message to the receiving client device; and wherein the media in the message is stored on one selected from the group consisting of an internal memory of the sending client device or the at least one wireless network while the media transfer messaging application determines whether or not the receiving client device is available to receive the message.

21. A media transfer system according to claim 16 wherein the network caching system stores the media item on one of the plurality of local servers for an amount of time based on the activity of the media item being transferred between the plurality of client devices in a geographical location.

22. A media transfer system according to claim 16 wherein the media transfer messaging application comprises a network traffic load awareness system to determine optimal delivery times of the message.

23. A method of transferring media on at least one wireless network between a plurality of client devices in communication with one another via the at least one wireless network, the plurality of client devices each having a media transfer messaging application stored thereon that relies on at least one security mechanism present on the at least one wireless network, the media transfer messaging application being stored on a central server to be downloaded by the plurality of client devices, wherein the media to be transmitted by the media transfer messaging application is selected from the group consisting of audio, video, pictures or text, wherein each of the plurality of client devices are defined as a receiving client device when receiving media and a sending client device when sending media, wherein the media transfer messaging application is configured to transmit media to the receiving client device that is consistent with capabilities of the receiving client device, the method comprising:

authenticating the sending client device prior to sending media to define an authenticated sending client device;

receiving the media as a message on the receiving client device, wherein the message, which includes a preamble and a main body separated by a pause, provides the receiving client device with an option to accept, reject, delay or schedule delivery of the message during the preamble;

providing the option of accepting, rejectinq, delaying or scheduling delivery of the message, wherein, upon selection of the option to delay or schedule delivery of the message, the media transfer messaging application prompts the receiving client device for at least one of a predetermined length of time to wait before delivering the message and a preset time at which to deliver the message;

sending a received message from the receiving client device to a sending client device;

determining optimal delivery times of the message using a network traffic load awareness system;

authenticating the sending client device and media to be transferred by the sending client device, wherein the media transfer messaging application relies on the security mechanism present on the at least one wireless network and that is in communication with the sending client device to perform authentication on the at least one wireless network;

automatically optimizing for transmission the media to be transferred with respect to the sending client device and the receiving client device; and conforming at least one setting of the sending client device and at least one setting of the receiving client device, wherein the media transfer messaging application comprises at least one security measure to ensure that media to be transferred between the sending client device and the receiving client device meets requirements of the at least one setting of both the sending client device and the receiving client device.

24. A method according to claim 23 wherein each of the plurality of client devices is selected from the group consisting of a computer, a wireless device adapted to be connected to a network, a public exchange phone or a social networking portal.

25. A method according to claim 23 wherein the media in the message is selected from the group consisting of a ringtone or a videotone received by the receiving client device so that the sending client device determines the type of ringtone or videotone to be played on the receiving client device.

26. A method according to claim 23 wherein the media received by the receiving client device is stored on an internal memory on the receiving client device.

27. A method according to claim 23 further comprising interfacing with a contacts file stored on each of the plurality of client devices to transfer the message to at least one selected contact.

28. A method according to claim 23 further comprising blocking incoming messages based on a parameter, wherein the parameter is selected from the group consisting of all messages, messages from at least one sending client device, messages having a predetermined type of content or messages having greater than a predetermined size.

29. A method according to claim 23 further comprising determining if the receiving client device is available to receive the message prior to delivering the message to the receiving client device; and storing the media in the message on one selected from the group consisting of an internal memory of the sending client device or the at least one wireless network while the media transfer messaging application determines whether or not the receiving client device is available to receive the message.

30. A method according to claim 23 wherein the at least one wireless network includes a central server and a plurality of local servers in communication with the central server, and wherein the plurality of local servers are deployed over a plurality of geographical locations of interest; and further comprising monitoring geographical activity of a media item being transferred between the plurality of client devices.

31. A method according to claim 30 further comprising storing the media item on one of the plurality of local servers for an amount of time based on the activity of the media item being transferred between the plurality of client devices in a geographical location.

32. A method according to claim 23 wherein the media being transferred is a voicemail, and wherein the voicemail is transferred from the sending client device to at least one receiving client device.

33. A method of transferring media on at least one wireless network between a plurality of client devices in communication with one another via the at least one wireless network, the plurality of client devices each having a media transfer messaging application stored thereon that relies on at least one security mechanism already present on the at least one wireless network, the media transfer messaging application being stored on a central server to be downloaded by the plurality of client devices, wherein the media to be transmitted by the media transfer messaging application is at least one of audio, video, pictures or text, wherein each of the plurality of client devices are defined as a receiving client device when receiving media and a sending client device when sending media, wherein the media transfer messaging application is configured to transmit media to the receiving client device that is consistent with capabilities of the receiving client device, the method comprising:

authenticating the sending client device prior to sending media to define an authenticated sending client device;

receiving the media as a message on the receiving client device, wherein the message, which includes a preamble and a main body separated by a pause, provides the receiving client device with an option to accept, reject, delay or schedule delivery of the message during the preamble;

providing the option of accepting, rejecting, delaying or scheduling delivery of the message, wherein, upon selection of the option to delay or schedule delivery of the message, the media transfer messaging application prompts the receiving client device for at least one of a predetermined length of time to wait before delivering the message and a preset time at which to deliver the message;

interfacing with a contacts database stored on each of the plurality of client devices to transfer the message to at least one selected contact;

wherein the at least one wireless network includes a central server and a plurality of local servers in communication with the central server, and wherein the plurality of local servers are deployed over a plurality of geographical locations of interest;

monitoring geographical activity of a media item being transferred between the plurality of client devices;

authenticating the sending client device and media to be transferred by the sending client device, wherein the media transfer messaging application relies on a security mechanism present on the at least one wireless network with which the sending client device is in communication to perform authentication on the at least one wireless network;

automatically optimizing for transmission the media to be transferred with respect to the sending client device and the receiving client device; and conforming at least one setting of the sending client device and at least one setting of the receiving client device, wherein the media transfer messaging application comprises at least one security measure to ensure that media to be transferred between the sending client device and the receiving client device meets requirements of the at least one setting of both the sending client device and the receiving client device.

34. A method according to claim 33 wherein each of the plurality of client devices is selected from the group consisting of a computer, a wireless device adapted to be connected to a network, a public exchange phone or a social networking portal.

35. A method according to claim 33 wherein the media in the message is at least one of a ringtone and a videotone received by the receiving client device so that the sending client device determines the type of ringtone or videotone to be played on the receiving client device.

36. A method according to claim 33 further comprising blocking incoming messages based on a parameter; and wherein the parameter is selected from the group consisting of all messages, messages from at least one sending client device, messages having a predetermined type of content or messages having greater than a predetermined size.

37. A method according to claim 33 further comprising determining if the receiving client device is available to receive the message prior to delivering the message to the receiving client device; and storing the media in the message on at least one of an internal memory of the sending client device and on the at least one wireless network while the media transfer messaging application determines whether or not the receiving client device is available to receive the message.

38. A method according to claim 33 further comprising storing the media item on one of the plurality of local servers for an amount of time based on the activity of the media item being transferred between the plurality of client devices in a geographical location.

39. A method according to claim 33 further comprising determining optimal delivery times of the message.

* * * * *